US012050431B2

(12) United States Patent
Sato et al.

(10) Patent No.: US 12,050,431 B2
(45) Date of Patent: Jul. 30, 2024

(54) IMAGE FORMING APPARATUS FACILITATING DETACHMENT OF TONER CARTRIDGE FROM PROCESS CARTRIDGE ATTACHED TO HOUSING OF IMAGE FORMING APPARATUS

(71) Applicant: Brother Kogyo Kabushiki Kaisha, Nagoya (JP)

(72) Inventors: Shougo Sato, Seto (JP); Miho Ishida, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/304,564

(22) Filed: Apr. 21, 2023

(65) Prior Publication Data

US 2023/0259067 A1 Aug. 17, 2023

Related U.S. Application Data

(63) Continuation of application No. 17/655,619, filed on Mar. 21, 2022, now Pat. No. 11,693,354, which is a (Continued)

(30) Foreign Application Priority Data

Nov. 13, 2019 (JP) ................................ 2019-205798

(51) Int. Cl.

| | |
|---|---|
| ***G03G 21/16*** | (2006.01) |
| ***G03G 15/08*** | (2006.01) |
| ***G03G 21/18*** | (2006.01) |

(52) U.S. Cl.
CPC ..... *G03G 21/1803* (2013.01); *G03G 15/0877* (2013.01); *G03G 21/1633* (2013.01); (Continued)

(58) Field of Classification Search
CPC ........... G03G 15/0877; G03G 21/1633; G03G 21/1647; G03G 21/1676; G03G 21/1803; (Continued)

(56) References Cited

U.S. PATENT DOCUMENTS 9,588,481 B2 * 3/2017 Sato .................. G03G 15/0189
2012/0183321 A1 7/2012 Mori et al.
(Continued)

FOREIGN PATENT DOCUMENTS

| | | |
|---|---|---|
| JP | 2008-191578 A | 8/2008 |
| JP | 2014-044323 A | 3/2014 |
| JP | 2018-055067 A | 4/2018 |

*Primary Examiner* — Sophia S Chen
(74) *Attorney, Agent, or Firm* — Merchant & Gould P.C.

(57) ABSTRACT

An image forming apparatus includes a housing, a top cover having an opening, a process cartridge attachable to the housing, a toner cartridge attachable to the process cartridge, and an interlocking mechanism. The top cover is pivotally movable between a first position closing the opening and a second position opening the opening. In a state where the toner cartridge is attached to the process cartridge, the toner cartridge is pivotally movable between an attachment/detachment position where the toner cartridge is attachable to and detachable from the process cartridge; and a fixed position where the toner cartridge is fixed to the process cartridge. The interlocking mechanism is configured to pivotally move the toner cartridge to the attachment/detachment position when the top cover is moved to the second position, and to pivotally move the toner cartridge to the fixed position when the top cover is moved to the first position.

11 Claims, 15 Drawing Sheets

Related U.S. Application Data continuation of application No. 17/094,070, filed on Nov. 10, 2020, now Pat. No. 11,294,327.

(52) U.S. Cl.
CPC ... *G03G 21/1676* (2013.01); *G03G 2221/163* (2013.01); *G03G 2221/1654* (2013.01)

(58) Field of Classification Search
CPC ......... G03G 21/1821; G03G 2221/163; G03G 2221/1654
See application file for complete search history.

(56) References Cited

U.S. PATENT DOCUMENTS

| | | | | |
|---|---|---|---|---|
| 2012/0275819 | A1 | 11/2012 | Mori et al. | |
| 2013/0243445 | A1 | 9/2013 | Takahira et al. | |
| 2014/0044450 | A1 | 2/2014 | Nakamura et al. | |
| 2015/0346636 | A1 | 12/2015 | Fukushima et al. | |
| 2017/0102641 | A1 * | 4/2017 | Sato | G03G 21/1676 |
| 2018/0095406 | A1 | 4/2018 | Shougo et al. | |
| 2019/0361384 | A1 | 11/2019 | Sato et al. | |
| 2021/0003964 | A1 | 1/2021 | Sato | |

* cited by examiner

IMAGE FORMING APPARATUS FACILITATING DETACHMENT OF TONER CARTRIDGE FROM PROCESS CARTRIDGE ATTACHED TO HOUSING OF IMAGE FORMING APPARATUS

CROSS REFERENCE TO RELATED APPLICATION

This application is a Continuation Application of U.S. patent application Ser. No. 17/655,619, filed Mar. 21, 2022, now U.S. Pat. No. 11,693,354, which is a Continuation Application of U.S. patent application Ser. No. 17/094,070, filed Nov. 10, 2020, now U.S. Pat. No. 11,294,327, issued Apr. 5, 2022, and claims priority from Japanese Patent Application No. 2019-205798 filed Nov. 13, 2019, the entireties of which are incorporated herein by reference.

TECHNICAL FIELD

The present disclosure relates to an image forming apparatus.

BACKGROUND

There has conventionally been known an image forming apparatus including a process cartridge including a photosensitive drum and a developing roller, and a toner cartridge accommodating therein toner. The toner cartridge is attachable to and detachable from the process cartridge. In a state where the toner cartridge is attached to the process cartridge, the toner accommodated in the toner cartridge is supplied to the process cartridge through a toner supply opening of the toner cartridge.

Such type of an image forming apparatus includes, for example, a housing for accommodating therein the process cartridge and the toner cartridge, and a top cover for opening and closing an opening of the housing. The replacement of the toner cartridge with a new toner cartridge is performed in a state where the top cover is open. The image forming apparatus further includes a shutter for opening and closing the toner supply opening so as to prevent toner from being scattered out of the toner supply opening when the toner cartridge is detached from the process cartridge. The image forming apparatus further includes a mechanism that closes the shutter of the toner supply opening in interlocking relation to opening motion of the top cover (for example, see Japanese Patent Application Publication No. 2014-044323).

Further, there has also been known an image forming apparatus including a top cover pivotally movable about an pivot axis for opening and closing an opening of a housing, a drum cartridge including a photosensitive drum, a developing cartridge attachable to and detachable from the drum cartridge and including a developing roller and a toner accommodation portion, and an LED head configured to expose the photosensitive drum to light.

Such type of an image forming apparatus includes a mechanism that tilts the developing cartridge in a direction away from the pivot axis of the top cover in interlocking relation to opening motion of the top cover (for example, see Japanese Patent Application Publication No. 2018-055067).

SUMMARY

There has been known a conventional image forming apparatus including a process unit that performs an image formation by supplying toner to a photosensitive drum that has been exposed to light by an LED head. In this type of an image forming apparatus, in view of minimization in replacement cost of cartridges, it is desirable that the process unit is constituted by two cartridges, i.e., a process cartridge having a long service life and a toner cartridge having a short service life, and that the replacement of the toner cartridge can be easily performed in a state where the process cartridge is attached to the housing.

However, the above-described desired structure in which the replacement of the toner cartridge can be easily performed with the process cartridge attached to the housing is difficult to achieve by just combining the technology described in the JP publication No. 2014-044323 in which the shutter of the toner supply opening is closed in interlocking relation to opening motion of the top cover, and the technology described in the JP publication No. 2018-055067 in which the developing cartridge is moved to be tilted in the direction away from the pivot axis of the top cover in interlocking with opening motion of the top cover.

In view of the foregoing, it is an object of the present disclosure to provide an image forming apparatus in which the replacement of the toner cartridge can be easily performed with the process cartridge attached to the housing in a case where the process unit is constituted by two cartridges, i.e., the process cartridge including the photosensitive drum and the developing roller, and the toner cartridge accommodating therein toner.

In order to attain the above and other objects, according to one aspect, the present disclosure provides an image forming apparatus including: a housing, a top cover, a process cartridge, a toner cartridge, and an interlocking mechanism. The housing has an opening. The top cover is pivotally movable about a first pivot axis between a first position where the top cover closes the opening and a second position where the top cover opens the opening. The process cartridge attachable to and detachable from the housing. The process cartridge includes: a developing roller, a photosensitive drum; and a support portion. The toner cartridge attachable to and detachable from the process cartridge. The toner cartridge includes: a toner accommodating portion configured to accommodate therein toner, and a connecting portion connectable to the process cartridge. The interlocking mechanism is configured to move the toner cartridge in interlocking with movement of the top cover. In a state where the toner cartridge is attached to the process cartridge, the toner cartridge is pivotally movable about a second pivot axis between: an attachment/detachment position where the toner cartridge is attachable to and detachable from the process cartridge, and a fixed position where the toner cartridge is fixed to the process cartridge. The second pivot axis extends in parallel to a rotation axis of the photosensitive drum. In a state where the process cartridge having the toner cartridge attached thereto is attached to the housing and the top cover is at the first position, the toner cartridge is supported by the support portion so as to have such a posture that the toner accommodating portion is positioned closer to the top cover than the connecting portion is to the top cover and the connecting portion is positioned closer to the support portion than the toner accommodating portion is to the support portion. The interlocking mechanism is configured to: pivotally move the toner cartridge from the fixed position to the attachment/detachment position when the top cover is moved from the first position to the second position; and pivotally move the toner cartridge from the attachment/detachment position to the fixed position when the top cover is moved from the second position to the first position.

According to another aspect, the present disclosure provides an image forming apparatus includes: a housing, a top cover, a first process cartridge, a second process cartridge, a first toner cartridge, a second toner cartridge, and an interlocking mechanism. The housing has an opening. The top cover is pivotally movable about a first pivot axis between a first position where the top cover closes the opening and a second position where the top cover opens the opening. The first process cartridge is attachable to and detachable from the housing. The first process cartridge comprising: a first developing roller, a first photosensitive drum, and a first support portion. The second process cartridge is attachable to and detachable from the housing. The second process cartridge includes: a second developing roller, a second photosensitive drum, and a second support portion. The first toner cartridge is attachable to and detachable from the first process cartridge. The first toner cartridge includes: a first toner accommodating portion configured to accommodate therein first toner, and a first connecting portion connectable to the first process cartridge. The second toner cartridge is attachable to and detachable from the second process cartridge. The second toner cartridge includes: a second toner accommodating portion configured to accommodate therein second toner, and a second connecting portion connectable to the second process cartridge. The interlocking mechanism is configured to move the first toner cartridge and the second toner cartridge in interlocking with movement of the top cover. In a state where the first toner cartridge is attached to the first process cartridge, the first toner cartridge is pivotally movable about a second pivot axis between: a first attachment/detachment position where the first toner cartridge is attachable to and detachable from the first process cartridge, and a first fixed position where the first toner cartridge is fixed to the first process cartridge. The second pivot axis extends in parallel to a first rotation axis of the first photosensitive drum. In a state where the second toner cartridge is attached to the second process cartridge, the second toner cartridge is pivotally movable about a third pivot axis between: a second attachment/detachment position where the second toner cartridge is attachable to and detachable from the second process cartridge, and a second fixed position where the second toner cartridge is fixed to the second process cartridge. The third pivot axis extends in parallel to a second rotation axis of the second photosensitive drum. In a state where the first process cartridge having the first toner cartridge attached thereto is attached to the housing and the top cover is at the first position, the first toner cartridge is supported by the first support portion so as to have such a posture that the first toner accommodating portion is positioned closer to the top cover than the first connecting portion is to the top cover and the first connecting portion is positioned closer to the first support portion than the first toner accommodating portion is to the first support portion. In a state where the second process cartridge having the second toner cartridge attached thereto is attached to the housing and the top cover is at the first position, the second toner cartridge is supported by the second support portion so as to have such a posture that the second toner accommodating portion is positioned closer to the top cover than the second connecting portion is to the top cover and the second connecting portion is positioned closer to the second support portion than the second toner accommodating portion is to the second support portion. The interlocking mechanism is configured to: when the top cover is moved from the first position to the second position, pivotally move the first toner cartridge from the first fixed position to the first attachment/detachment position; and pivotally move the second toner cartridge from the second fixed position to the second attachment/detachment position; and when the top cover is moved from the second position to the open position, pivotally move the first toner cartridge from the first attachment/detachment position to the first fixed position; and pivotally move the second toner cartridge from the second attachment/detachment position to the second fixed position.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

Figure 1:
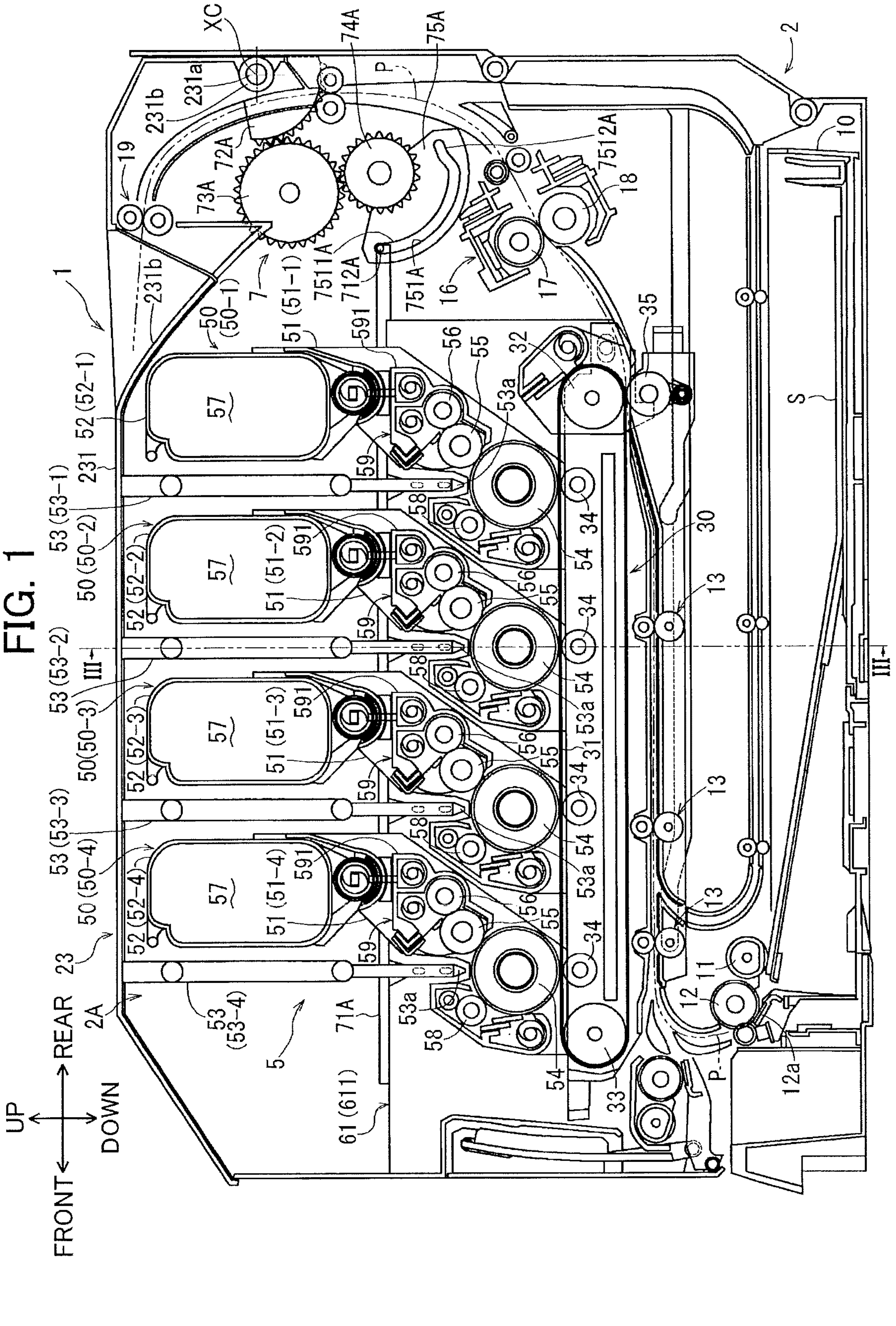
FIG. 1 is a vertical cross-sectional side view of an image forming apparatus taken along a widthwise center plane according to one embodiment.

Hereinafter, an image forming apparatus 1 according to one embodiment of the present disclosure will be described with reference to FIGS. 1 through 13.

<Overall Structure of Image Forming Apparatus>

The image forming apparatus 1 illustrated in FIG. is an electro-photographic type tandem color printer configured to form multiple color image on a sheet S.

In the following description, the left side, right side, near side, and far side in FIG. 1 will be defined respectively as the front side, rear side, right side, and left side of the image forming apparatus 1. Further, the upper side and lower side in FIG. 1 will be defined respectively as the upper side and lower side of the image forming apparatus 1.

The image forming apparatus 1 includes a housing 2, a sheet supply tray 10 for supporting the sheet S, and an image forming unit 5 configured to form an image on the sheet S.

The housing 2 has a generally rectangular parallelepiped shape, and accommodates therein the sheet supply tray 10 and the image forming unit 5. The housing 2 has an upper surface 23 formed with an opening 2A. The housing 2 includes a top cover 231 configured to open and close the opening 2A and a bearing 231*c* supporting a pivot shaft 231*a* described later.

The top cover 231 has a rear end portion provided with the pivot shaft 231*a*. The pivot shaft 231*a* is supported by the bearing 231*c* so as to be rotatable about a cover pivot axis XC that extends in the left-right direction and passes through the center of the pivot shaft 231*a*. The top cover 231 is pivotally movable about the pivot shaft 231*a* between a first position in which the top cover 231 closes the opening 2A and a second position in which the top cover 231 opens the opening 2A. That is, the top cover 231 is pivotally movable about the cover pivot axis XC between the first position and the second position. The cover pivot axis XC is an example of the first pivot axis. The top cover 231 includes a sheet discharge tray 231*b*. The sheet discharge tray 231*b* is inclined downward as it extends rearward.

A sheet conveying passage P for conveying the sheet S is provided in the housing 2, and extends from the sheet supply tray 10 to the sheet discharge tray 231*b* via the image forming unit 5. Inside the housing 2, a sheet supply roller 11, a separation roller 12, and a separation pad 12*a* are provided. The sheets S that are supported in the sheet supply tray 10 are separated one by one from the remaining sheets and fed to the sheet conveying passage P by the sheet supply roller 11, the separation roller 12 and the separation pad 12*a*.

The image forming unit 5 is positioned above the sheet supply tray 10 and includes four process units 50 arrayed in the front-rear direction. Each of the process units 50 is attachable to and detachable from the housing 2. The four process units 50 correspond to the color of black, yellow, magenta, and cyan.

The housing 2 includes a side frame 61, and the process units 50 are supported by the side frame 61. Each process unit 50 includes a process cartridge 51 and a toner cartridge 52. The process cartridge 51 is attachable to and detachable from the side frame 61, and the toner cartridge 52 is attachable to and detachable from the process cartridge 51.

The process cartridge 51 includes a photosensitive drum 54, a charge roller 58, and a developing unit 59. The photosensitive drum 54 has a generally cylindrical shape whose axial direction is directed in the left-right direction. The photosensitive drum 54 is rotatably supported by a pair of drum frames (described later) of the process cartridge 51. The photosensitive drum 54 extends in the left-right direction and is in contact with a front upper portion of the photosensitive drum 54.

The developing unit 59 includes a developing roller 55, a supply roller 56, and a developing frame 591. The developing frame 591 is supported by the pair of frames of the process cartridge 51 so as to be reciprocatingly movable. The developing roller 55 extends in the left-right direction and is rotatably supported by the developing frame 591. The developing roller 55 is in contact with a rear upper portion of the photosensitive drum 54. The supply roller 56 extends in the left-right direction and is rotatably supported by the developing frame 591. The supply roller 56 is in contact with a rear upper portion of the developing roller 55.

The toner cartridge 52 includes a toner accommodating portion 57 configured to accommodate therein toner as developing agent. The toner accommodating portion 57 is positioned above the developing unit 59. Toner is supplied from the toner accommodating portion 57 to the supply roller 56. The supply roller 56 supplies the toner to the developing roller 55. The developing roller 55 supplies the toner to the photosensitive drum 54.

The top cover 231 is provided with four exposure heads 53 configured to expose surfaces of the photosensitive drums 54 to light. The four exposure heads 53 are provided in one-to-one correspondence with the four photosensitive drums 54. The exposure heads 53 are arrayed in the front-rear direction. The exposure head 53 extends downward from the top cover 231 and includes a light emitting portion 53*a*. The light emitting portion 53*a* is provided at the lower end portion of the exposure head 53. The light emitting portion 53*a* is positioned adjacent to an upper portion of the photosensitive drum 54 in a state where the top cover 231 is closed. The light emitting portion 53*a* is constituted by an LED array including a plurality of LED elements arrayed in line in the left-right direction.

An intermediate transfer belt 31 is positioned below the photosensitive drum 54 and faces the same. The intermediate transfer belt 31 is looped between a drive roller 33 and a follower roller 32 positioned rearward of the drive roller 33. Four primary transfer rollers 34 are provided for the four photosensitive drums 54. Each of the primary transfer rollers 34 is positioned on the opposite side of the intermediate transfer belt 31 from the corresponding photosensitive drum 54. In other words, each of the primary transfer rollers 34 is disposed below the corresponding photosensitive drum 54 and faces the same with the intermediate transfer belt 31 interposed therebetween.

The follower roller 32 is in contact with a secondary transfer roller 35 via the intermediate transfer belt 31. The follower roller 32 and the secondary transfer roller 35 nip the intermediate transfer belt 31 therebetween. The intermediate transfer belt 31, the follower roller 32, the drive roller 33, the primary transfer rollers 34, and the secondary transfer roller 35 constitute a belt unit 30.

In the image forming unit 5, the surface of the photosensitive drum 54 is uniformly charged by the charge roller 58 and then is locally exposed to light by the exposure head 53 on the basis of predetermined image data. As a result, an electrostatic latent image based on the image data is formed on the surface of the photosensitive drum 54.

On the other hand, toner supplied from the toner accommodating portion 57 is charged with positive polarity at a position between the supply roller 56 and the developing roller 55, and is carried on the surface of the developing roller 55. Then, the toner carried on the developing roller 55 is supplied to the electrostatic latent image formed on the surface of the photosensitive drum 54, so that toner image is carried on the surface of the photosensitive drum 54.

The toner image carried on the surface of the photosensitive drum 54 is primarily transferred onto the intermediate transfer belt 31 by a transfer bias applied to the primary transfer rollers 34. The toner images formed on the photosensitive drums 54 are superimposed with each other on the intermediate transfer belt 31.

The sheet S fed from the sheet supply tray 10 to the sheet conveying passage P is conveyed rearward by a plurality of conveyer rollers 13 and introduced to a nipping portion between the intermediate transfer belt 31 and the secondary transfer roller 35. The sheet S introduced to the nipping portion is conveyed while being nipped between the intermediate transfer belt 31 and the secondary transfer roller 35.

The secondary transfer roller 35 is applied with a secondary transfer bias whose polarity is opposite to the charged polarity of the toner image formed on the intermediate transfer belt 31. Hence, the toner image on the intermediate transfer belt 31 is secondarily transferred onto the sheet S in the process in which the sheet S is conveyed and passes through the portion between the intermediate transfer belt 31 and the secondary transfer roller 35.

The sheet S having the toner image transferred thereon is conveyed to a fixing unit 16 positioned downstream of the image forming unit 5 in a sheet conveying direction. The fixing unit 16 includes a heat roller 17 and a pressure roller 18 in pressure contact with the heat roller 17. The toner image on the sheet S conveyed to the fixing unit 16 is thermally fixed to the sheet S in the process in which the sheet S passes through a portion between the heat roller 17 and the pressure roller 18.

The sheet S having the toner image thermally fixed thereon is conveyed from the fixing unit 16 to the downstream side in the sheet conveying direction, and the sheet S is further conveyed by a discharge roller 19 and is discharged onto the sheet discharge tray 231*b*.

<Structure for Supporting Process Unit>

Figure 2:
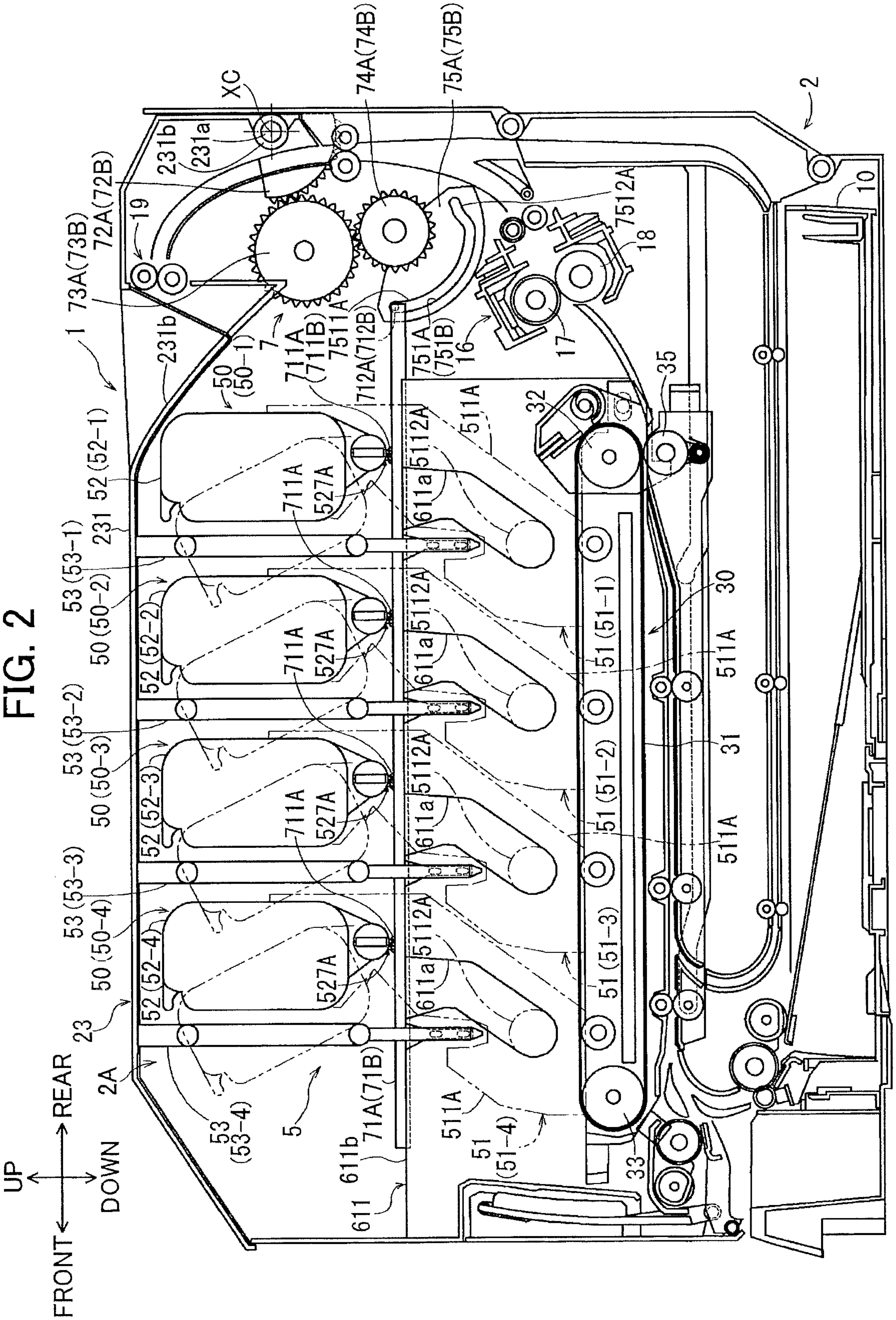
FIG. 2 is a vertical cross-sectional side view of the image forming apparatus where a top cover is at a first position.
Figure 3:
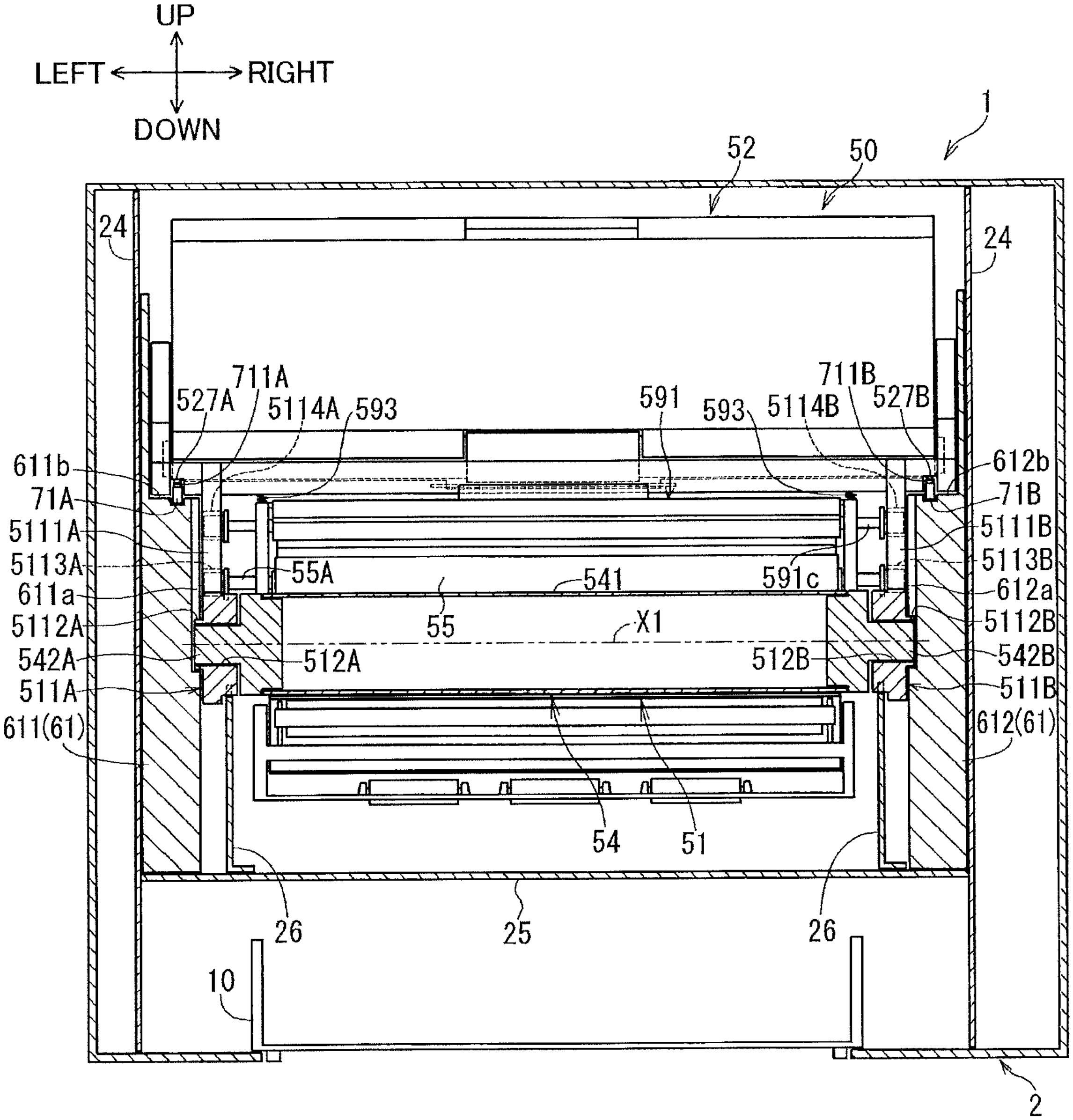
FIG. 3 is a cross-sectional view taken along the line III-III in FIG. 1.

As illustrated in FIGS. 2 and 3, the side frame 61 is configured to support the four process units 50. The side frame 61 includes a first side frame 611 and a second side frame 612 which are disposed on the left and right sides of the process units 50. Each of the first side frame 611 and the second side frame 612 is a plate-like member extending in the front-rear direction. The first side frame 611 is positioned leftward of the process units 50, and the second side frame 612 is positioned rightward of the process units 50.

The first side frame 611 is formed with support grooves 611*a*. The number of the support grooves 611*a* corresponds to the number of the process units 50 supported by the side frame 61. In the present embodiment, the first side frame 611 is formed with four support grooves 611*a* for the four process units 50. The four support grooves 611*a* are arrayed in the front-rear direction in one-to-one correspondence with the four process units 50. Each of the support grooves 611*a* extends in approximately the up-down direction and has an upper open end.

The second side frame 612 is formed with support grooves 612*a*. The number of the support grooves 612*a* corresponds to the number of the process units 50 supported by the side frame 61. In the present embodiment, the second side frame 612 is formed with four support grooves 612*a* for the four process units 50. The four support grooves 612*a* are arrayed in the front-rear direction in one-to-one correspondence with the four process units 50. Each of the support grooves 612*a* extends in approximately the up-down direction and has an upper open end.

The process cartridge 51 of each of the process units 50 includes the pair of left and right frames, i.e., a left drum frame 511A and a right drum frame 511B which support the photosensitive drum 54. The photosensitive drum 54 includes a drum body 541, a drum shaft 542A protruding leftward from the drum body 541, and a drum shaft 542B protruding rightward from the drum body 541. The left drum frame 511A rotatably supports the drum shaft 542A, and the right drum frame 511B rotatably supports the drum shaft 542B.

The drum shaft 542A is an example of the first end portion of the photosensitive drum in the rotation axis direction. The drum shaft 542B is an example of the second end portion of the photosensitive drum in the rotation axis direction. The left drum frame 511A is an example of the first drum frame supporting the first end portion in the rotation axis direction of the photosensitive drum. The right drum frame 511B is an example of the second drum frame supporting the second end portion in the rotation axis direction of the photosensitive drum.

The photosensitive drum 54 in which the drum shaft 542A and the drum shaft 542B are rotatably supported by the left drum frame 511A and the right drum frame 511B, respectively, is rotatable about a rotation axis X1 extending in the left-right direction.

The left drum frame 511A includes a side wall portion 5111A extending in the up-down direction, and a protruding portion 5112A protruding leftward from the side wall portion 5111A. The portion of the side wall portion 5111A that is provided with the protruding portion 5112A is formed with a support hole 512A for rotatably supporting the drum shaft 542A.

The right drum frame 511B includes a side wall portion 5111B extending in the up-down direction, and a protruding portion 5112B protruding rightward from the side wall portion 5111B. The portion of the side wall portion 5111B that is provided with the protruding portion 5112B is formed with a support hole 512B for rotatably supporting the drum shaft 542B.

The protruding portion 5112A of the process cartridge 51 is insertable into the support groove 611*a* of the first side frame 611 from above, i.e., from the upper open end of the support groove 611*a*. The protruding portion 5112B of the process cartridge 51 is insertable into the support groove 612*a* of the second side frame 612 from above, i.e., from the upper open end of the support groove 612*a*.

The protruding portion 5112A of the process cartridge 51 is supported by the first side frame 611 by inserting the protruding portion 5112A in the support groove 611*a*, and the protruding portion 5112B of the process cartridge 51 is supported by the second side frame 612 by inserting the protruding portion 5112B in the support groove 612*a*. As a result, the process unit 50 is attached to the side frame 61.

The protruding portion 5112A of the process cartridge 51 is an example of the first end of the process cartridge, and the protruding portion 5112B of the process cartridge 51 is an example of the second end of the process cartridge opposite to the first end.

The housing 2 includes vertical frames 24 extending in the front-rear direction and the up-down direction. The vertical frames 24 are positioned at the left and right end portions of the housing 2. The housing 2 also includes a horizontal frame 25 horizontally extending from the left vertical frame 24 to the right vertical frame 24. The horizontal frame 25 is positioned below the first side frame 611 and the second side frame 612.

A pair of left and right support plates 26 upstands from the horizontal frame 25. The support plates 26 are plate-like members extending in the front-rear direction. The support plates 26 are positioned between the first side frame 611 and the second side frame 612 in the left-right direction.

The left and right support plates 26 support the left drum frame 511A and the right drum frame 511B from below, respectively, so that the position of the process cartridge 51 relative to the housing 2 is fixed.

The left and right support plates 26 are formed of sheet metal members made by press working using the same metal mold, and thus have a shape identical to each other. Hence, the photosensitive drum 54 can be suppressed from being out of position in a state where the position of the process cartridge 51 is fixed.

<Toner Cartridge>

Figure 4A:
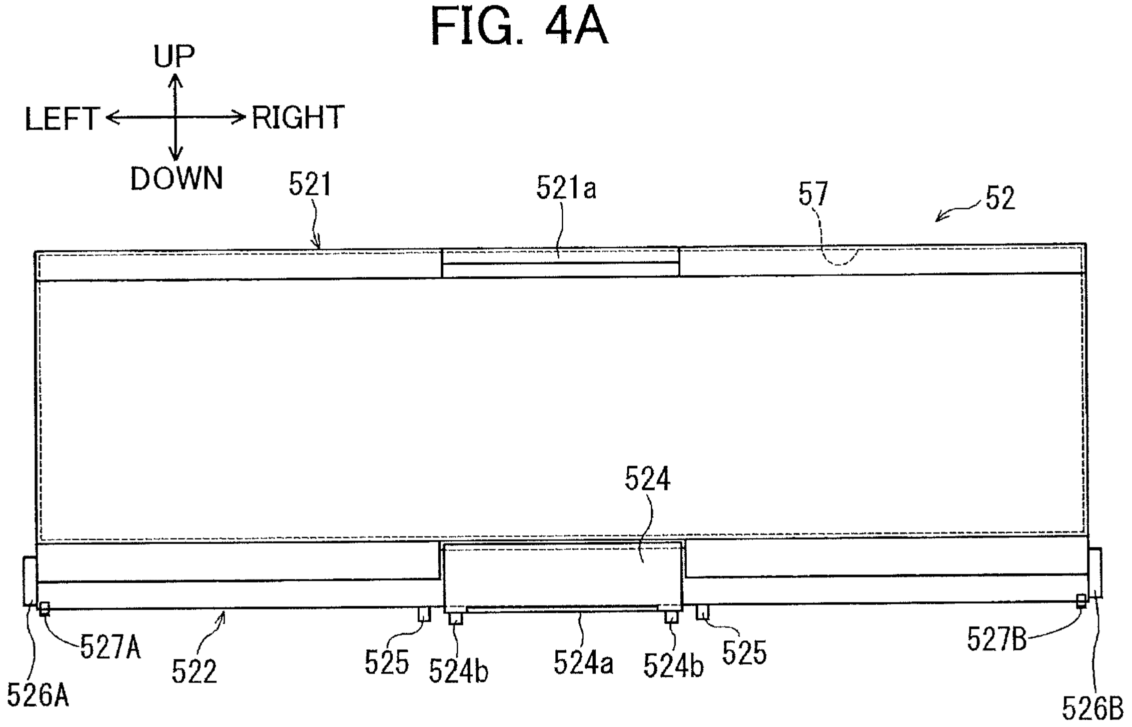
FIG. 4A is a front view of a toner cartridge in the image forming apparatus according to the embodiment.
Figure 4B:
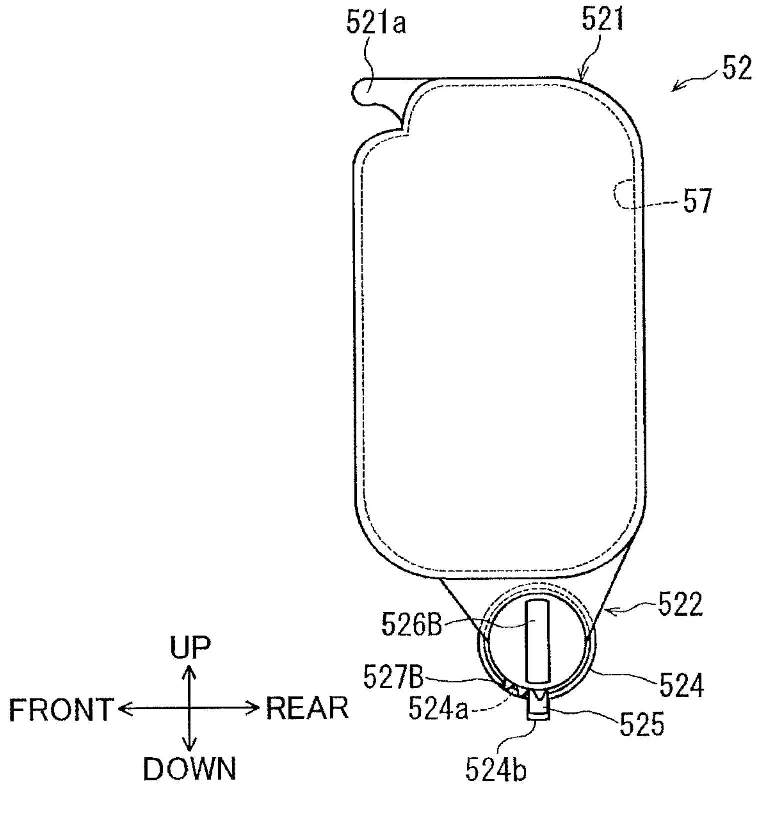
FIG. 4B is a side view of the toner cartridge.
Figure 5:
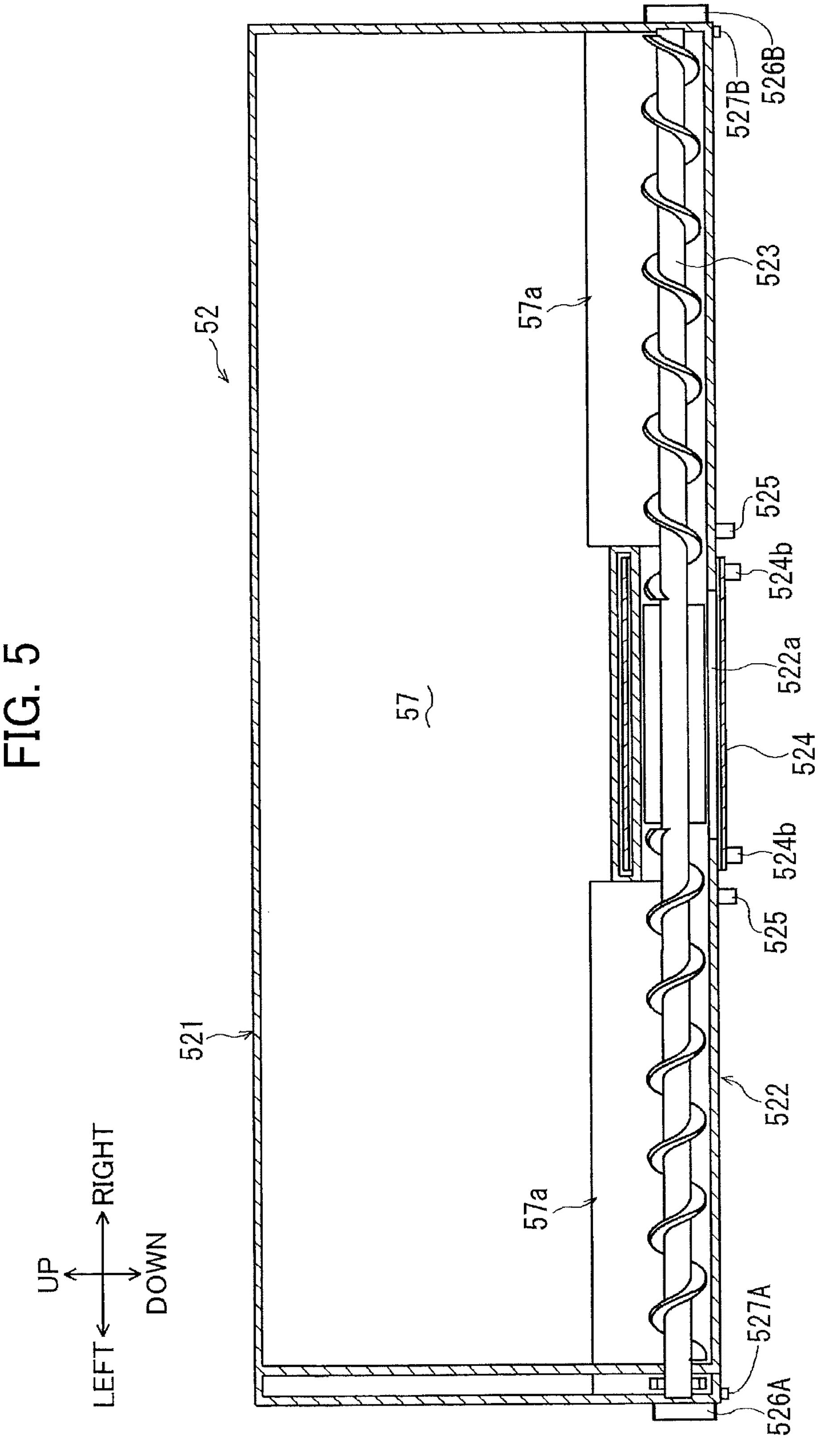
FIG. 5 is a cross-sectional front view of the toner cartridge.

As illustrated in FIGS. 4A to 5, the toner cartridge 52 includes a toner cartridge casing 521. In the toner cartridge casing 521, the toner accommodating portion 57 configured to accommodate therein toner is formed. The upper end portion of the toner cartridge casing 521 is provided with a hand grip 521*a* that the user can grip when detaching the toner cartridge 52 from the process cartridge 51.

The toner cartridge casing 521 includes a connecting portion 522 provided below the toner accommodating portion 57 of the toner cartridge casing 521. The connecting portion 522 is connectable to the process cartridge 51 in a process of attachment of the toner cartridge 52 to the process cartridge 51. In the toner cartridge 52, toner accommodated in the toner accommodating portion 57 can be supplied to the supply roller 56 of the process cartridge 51 through the connecting portion 522.

The toner accommodating portion 57 is in communication with an interior of the connecting portion 522 through communication holes 57*a* positioned at left and right end portions of the connecting portion 522, so that toner accommodated in the toner accommodating portion 57 can flow into the connecting portion 522 through the communication holes 57*a*. A screw feeder 523 is provided inside the connecting portion 522. The screw feeder 523 is disposed such that its center axis direction is directed in the left-right direction. The screw feeder 523 is configured to convey toner flowed into the left and right end portions of the connecting portion 522 through the communication holes 57*a* toward a center portion in the left-right direction of the connecting portion 522.

The lower portion of the connecting portion 522 has an arcuate shape protruding downward in side view. The center portion in the left-right direction of the lower end portion of the connecting portion 522 is formed with a toner supply opening 522*a* allowing toner to pass therethrough. The toner supply opening 522*a* is formed of an elongated slot extending in the left-right direction.

The toner cartridge 52 further includes a toner cartridge shutter 524 configured to open and close the toner supply opening 522*a*. The toner cartridge shutter 524 is an example of the shutter of the connecting portion.

The toner cartridge shutter 524 is positioned at the center portion in the left-right direction of the connecting portion 522. The toner cartridge shutter 524 is formed of a generally hollow cylindrical member. The toner cartridge shutter 524 is fit around the connecting portion 522 in a posture in which the center axis direction of the toner cartridge shutter 524 is directed in the left-right direction. The toner cartridge shutter 524 is formed with a communication opening 524*a* that is an elongated slot extending in the left-right direction. The communication opening 524*a* has a size in conformance with those of the toner supply opening 522*a*.

Two first protruding portions 524*b* are provided at the toner cartridge shutter 524 at positions outward of the toner supply opening 522*a* in the left-right direction. The two first protruding portions 524*b* protrude downward from the toner cartridge shutter 524. As illustrated in FIG. 4B, the positions of the first protruding portions 524*b* are different from the position of the communication opening 524*a* in the circumferential direction of the toner cartridge shutter 524. The communication opening 524*a* is formed frontward of the first protruding portions 524*b* in the circumferential direction.

Two second protruding portions 525 are provided at the lower end portion of the connecting portion 522 at positions outward of the toner cartridge shutter 524 in the left-right direction. The two second protruding portions 525 protrude downward from the lower end portion of the connecting portion 522. The positions of the second protruding portions 525 are coincident with the position of the toner supply opening 522*a* in the circumferential direction of the connecting portion 522.

Guide protruding portions 526A and 526B protruding outwardly in the left-right direction are provided at the left and right end portions of the connecting portion 522. The guide protruding portion 526A is positioned at the left end portion of the connecting portion 522 and protrudes leftward therefrom. The guide protruding portion 526B is positioned at the right end portion of the connecting portion 522 and protrudes rightward therefrom. Each of the guide protruding portions 526A and 526B has a rectangular shape extending in the up-down direction in side view.

The toner cartridge shutter 524 is rotatable relative to the connecting portion 522 of the toner cartridge casing 521 about the center axis of the toner cartridge shutter 524. As a result, the toner cartridge shutter 524 is rotatable between a closed position in which the toner cartridge shutter 524 closes the toner supply opening 522*a* and an open position in which the toner cartridge shutter 524 opens the toner supply opening 522*a*.

Figure 6A:
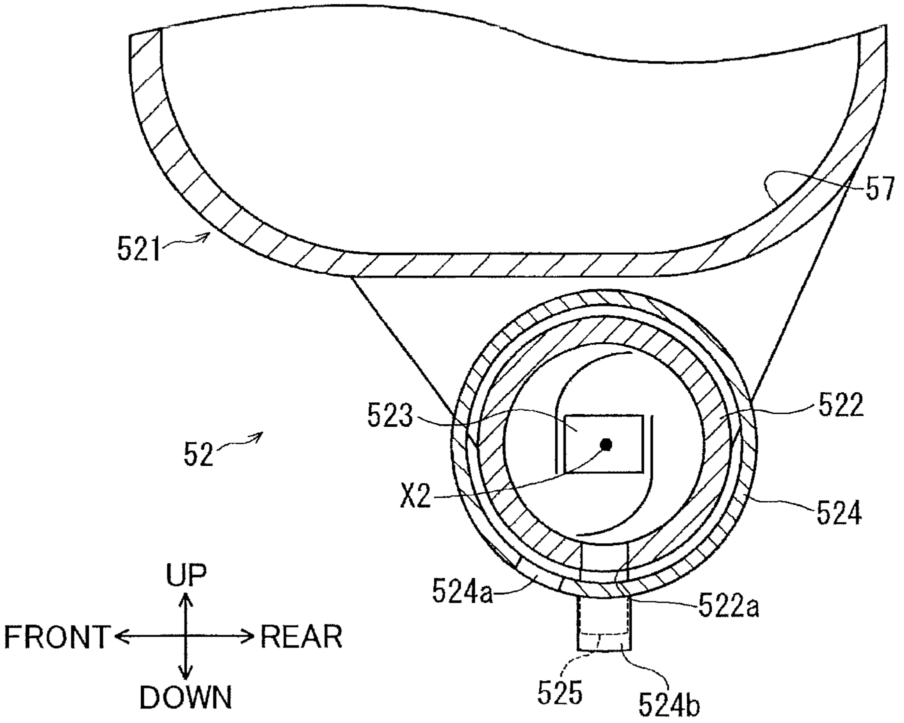
FIG. 6A is a partial cross-sectional side view of the toner cartridge and particularly illustrating a closed state of a first shutter.
Figure 7A:
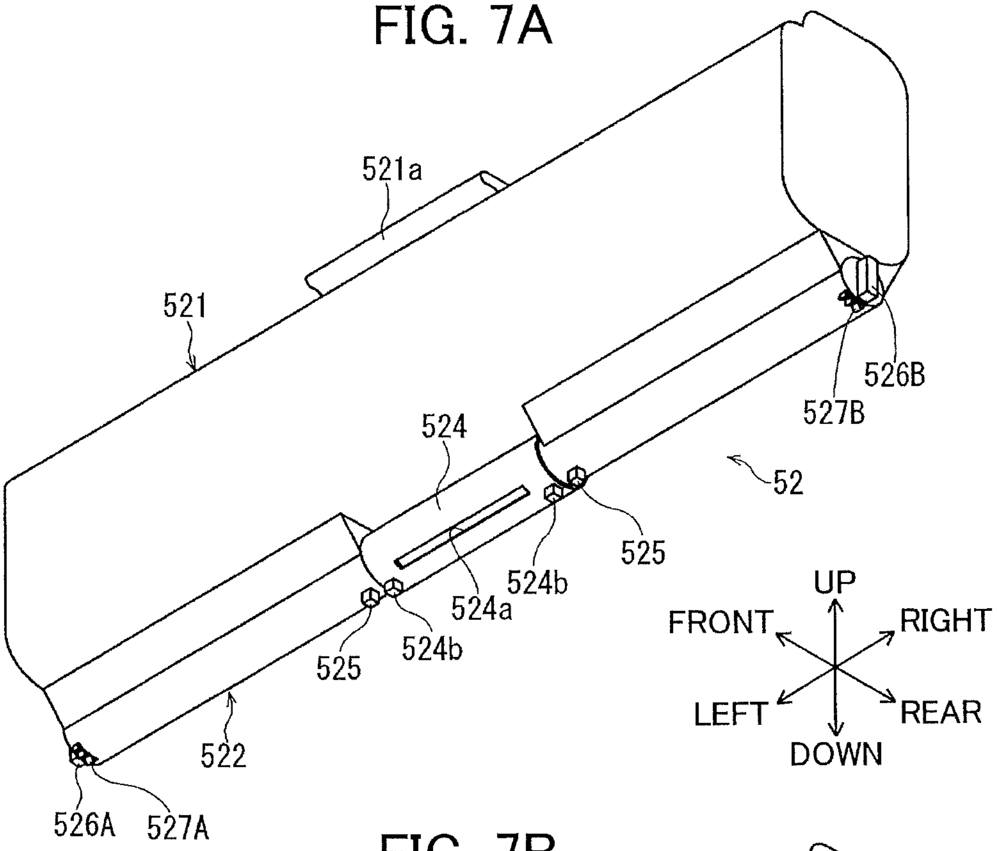
FIG. 7A is a perspective view of the toner cartridge and particularly illustrating the closed state of the first shutter.

For example, as illustrated in FIGS. 6A and 7A, in a state where the toner cartridge shutter 524 is positioned at such a rotational position that the communication opening 524*a* of the toner cartridge shutter 524 is offset from the toner supply opening 522*a* of the connecting portion 522 in the circumferential direction, the toner supply opening 522*a* is closed by the toner cartridge shutter 524.

The state where the toner supply opening 522*a* is closed by the toner cartridge shutter 524 is the state where the toner cartridge shutter 524 is at the closed position. In this case, the position of the first protruding portions 524*b* of the toner cartridge shutter 524 is coincident with the position of the second protruding portions 525 in the circumferential direction.

Figure 6B:
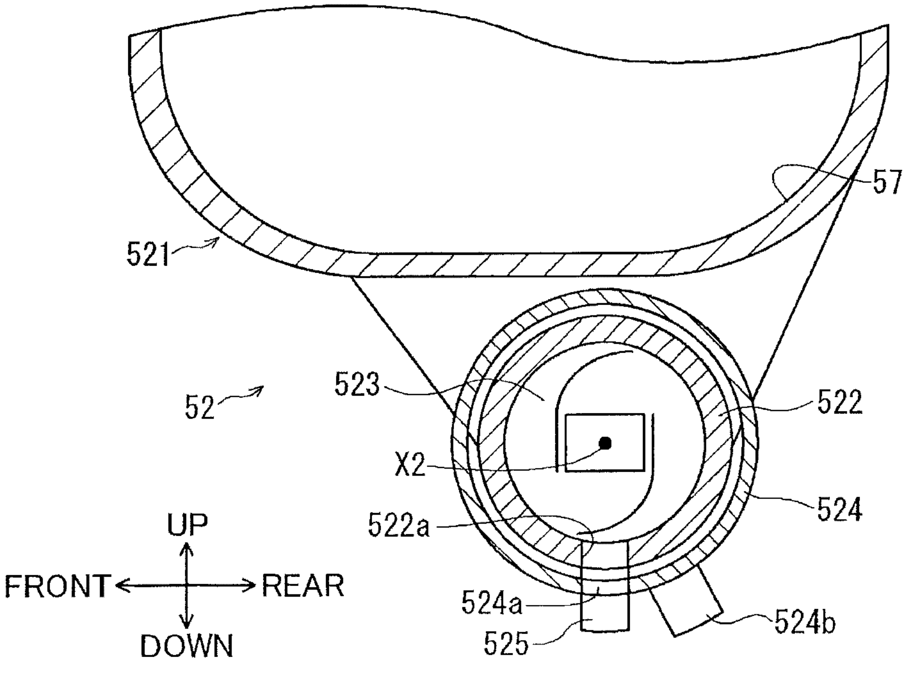
FIG. 6B is a partial cross-sectional side view of the toner cartridge and particularly illustrating an open state of the first shutter.
Figure 7B:
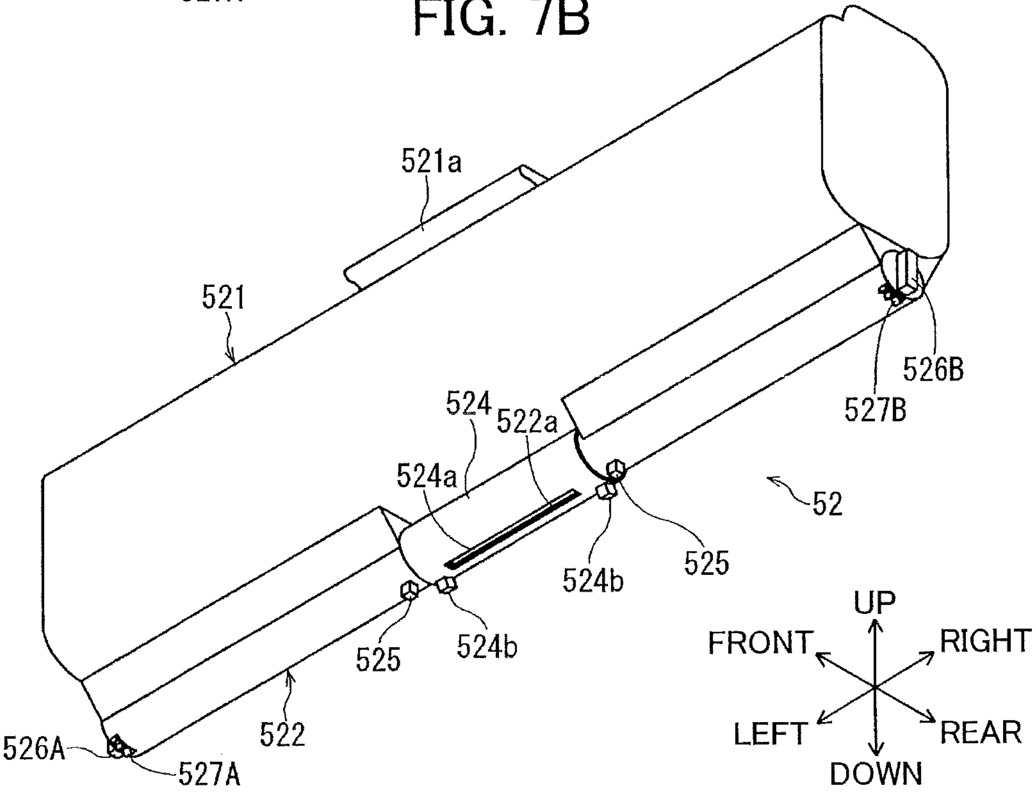
FIG. 7B is a perspective view of the toner cartridge and particularly illustrating the open state of the first shutter.

On the other hand, as illustrated in FIGS. 6B and 7B, in a state where the toner cartridge shutter 524 is positioned at such a rotational position that the communication opening 524*a* of the toner cartridge shutter 524 is coincide with the toner supply opening 522*a* of the connecting portion 522 in the circumferential direction, the toner supply opening 522*a* is in communication with the communication opening 524*a* and thus the toner supply opening 522*a* is opened by the toner cartridge shutter 524.

The state where the toner supply opening 522*a* is opened by the toner cartridge shutter 524 is the state where the toner cartridge shutter 524 is at the open position. In this case, the position of the first protruding portion 524*b* of the toner cartridge shutter 524 is different from the position of the second protruding portions 525 of the connecting portion 522 in the circumferential direction, and the first protruding portion 524*b* is positioned rearward of the second protruding portion 525.

In this way, in the toner cartridge 52, by rotating the toner cartridge shutter 524 relative to the connecting portion 522 to change the rotational position of the toner cartridge shutter 524 relative to the connecting portion 522, opening and closing of the toner supply opening 522*a* by the toner cartridge shutter 524 can be performed.

As illustrated in FIGS. 4A through 5, a first gear 527A and a second gear 527B are provided at the lower end portion of the connecting portion 522 of the toner cartridge 52. In other words, the first and second gears 527A and 527B are positioned at the connecting portion 522 side of the toner cartridge 52 in the up-down direction. More specifically, the first and second gears 527A and 527B are provided at the connecting portion 522 of the toner cartridge 52.

The first gear 527A is positioned at the left end portion of the connecting portion 522, and the second gear 527B is positioned at the right end portion of the connecting portion 522. The first gear 527A and second gear 527B protrude radially outwardly of the outer circumferential surface of the lower end portion of the connecting portion 522. The first gear 527A is an example of the first end side actuated portion of the actuated portion, and the second gear 527B is an example of the second end side actuated portion of the actuated portion.

<Process Cartridge>

[Connection Frame]

As illustrated in FIGS. 8A through 10B, the process cartridge 51 includes a connection frame 514 connecting the left drum frame 511A and the right drum frame 511B. The connection frame 514 extends in the left-right direction from the side wall portion 5111A of the left drum frame 511A to the side wall portion 5111B of the right drum frame 511B.

The connection frame 514 includes a pair of support surface portions 514*a* and an opening/closing surface portion 514*b*. The support surface portions 514*a* are positioned at the left portion and the right portion of the connection frame 514 and are configured to support the toner cartridge 52 attached to the process cartridge 51. The support surface portions 514 support the toner cartridge 52 such that the toner cartridge 52 takes a posture in which the toner accommodating portion 57 is positioned above the connecting portion 522, i.e., the connecting portion 522 is positioned below the toner accommodating portion 57.

The support surface portion 514*a* of the connection frame 514 is an example of the support portion configured to support the toner cartridge. The support surface portion 514*a* has an arcuate shape protruding downward in side view which is in conformance with the shape of the lower portion of the connecting portion 522 of the toner cartridge casing 521.

The opening/closing surface portion 514*b* is positioned between the right support surface portion 514*a* and the left support portion 514*a*. The opening/closing surface portion 514*b* has an arcuate shape protruding downward in side view. The arcuate shape of the opening/closing surface portion 514*b* has a radius greater than that of the arcuate shape of each of the support surface portions 514*a*.

The opening/closing surface portion 514*b* is formed with a toner receiving opening 514*c* that is an elongated slot extending in the left-right direction. The toner receiving opening 514*c* has a size in conformance with those of the toner supply opening 522*a* of the connecting portion 522. The opening/closing surface portion 514*b* is formed with a pair of first recessed portions 514*d* at positions outward of the toner receiving opening 514*c* in the left-right direction.

The first recessed portions 514*d* are recessed portions into which the first protruding portions 524*b* of the toner cartridge shutter 524 are fitted upon attachment of the toner cartridge 52 to the process cartridge 51. The first recessed portion 514*d* has a shape and size in conformance with those of the first protruding portion 524*b*. The positions of the first recessed portions 514*d* are different from the position of the toner receiving opening 514*c* in the circumferential direction. The toner receiving opening 514*c* is formed frontward of the first recessed portions 514*d* in the circumferential direction.

The process cartridge 51 includes a process cartridge shutter 515 configured to open and close the toner receiving opening 514*c* of the connection frame 514. The process cartridge shutter 515 is positioned above the opening/closing surface portion 514*b*, and has an arcuate shape protruding downward in side view. The left and right end portions of the process cartridge shutter 515 are supported by the support surface portion 514*a* so as to be slidably movable in the circumferential direction. As a result, the process cartridge shutter 515 is slidably movable relative to the opening/closing surface portion 514*b* in the circumferential direction.

The process cartridge shutter 515 is formed with a communication opening 515*a* that is an elongated slot extending in the left-right direction. The communication opening 515*a* has a size in conformance with the size of the toner supply opening 522*a* of the connecting portion 522. The process cartridge shutter 515 is formed with a pair of second recessed portions 515*b* at positions outward of the communication opening 515*a* in the left-right direction.

The second recessed portions 515*b* are recessed portions into which the second protruding portions 525 of the toner cartridge 52 are fitted upon attachment of the toner cartridge 52 to the process cartridge 51. The second recessed portion 515*b* has a shape and size in conformance with those of the second protruding portion 525. The positions of the second recessed portions 515*b* are coincident with the position of the communication opening 515*a* in the circumferential direction.

The process cartridge shutter 515 is formed with a pair of insertion holes 515*c* positioned between the communication opening 515*a* and the second recessed portions 515*b* in the left-right direction. Specifically, the left insertion hole 515*c* is positioned between the left second recessed portion 515*b* and the communication opening 515*a* in the left-right direction, and the right insertion hole 515*c* is positioned between the right second recessed portion 515*b* and the communication opening 515*a* in the left-right direction. Each of the insertion holes 515*c* is an elongated slot extending in the circumferential direction. Each of the first protruding portions 524*b* of the toner cartridge shutter 524 is insertable through the corresponding insertion hole 515*c*.

Each of the insertion holes 515*c* is formed at a position in alignment with the corresponding first recessed portion 514*d* of the opening/closing surface portion 514*b*, so that the corresponding first protruding portion 524*b* can be fitted into the first recessed portion 514*d* with the first protruding portion 524*b* inserted through the insertion hole 515*c*. The length in the circumferential direction of the insertion hole 515*c* is greater than that of the first protruding portion 524*b*. Hence, the process cartridge shutter 515 is slidably movable in the circumferential direction in a state where the first protruding portion 524*b* is inserted through the insertion hole 515*c* and is fitted into the first recessed portion 514*d*.

Sliding movement of the process cartridge shutter 515 in the circumferential direction relative to the connection frame 514 enables the process cartridge shutter 515 to open and close the toner receiving opening 514*c* of the connection frame 514.

Figure 10A:
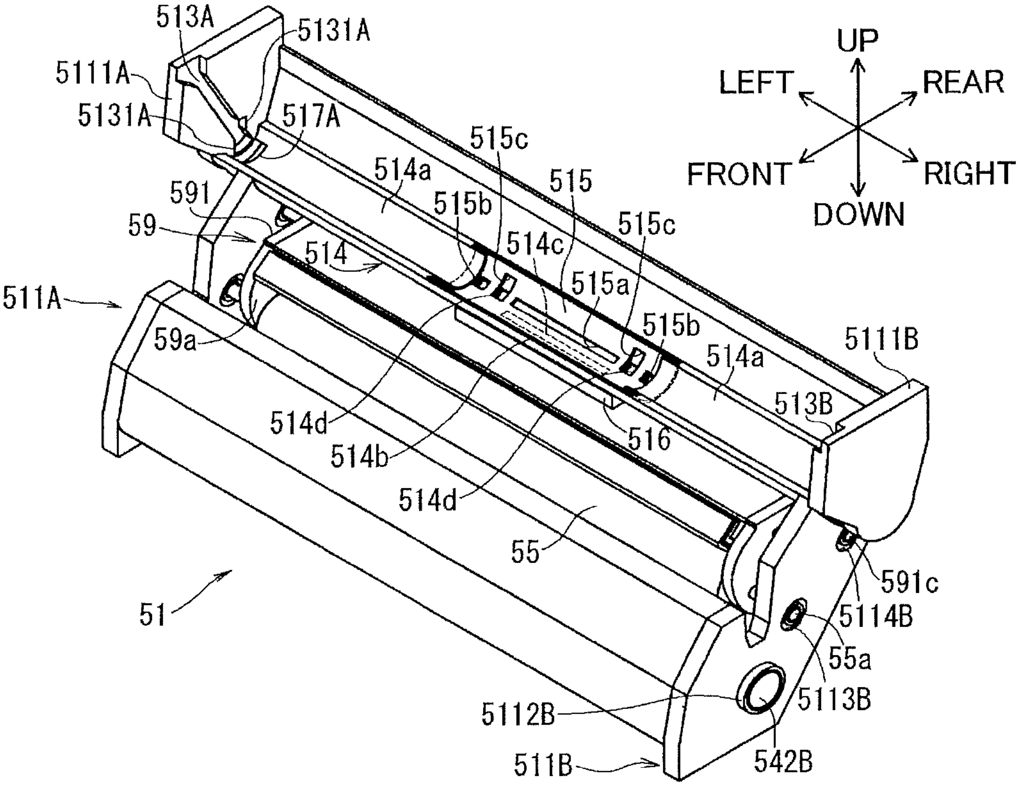
FIG. 10A is a perspective view of the process cartridge in a closed state of a second shutter.

For example, as illustrated in FIG. 10A, in a state where the process cartridge shutter 515 is positioned at such a sliding position that the communication opening 515*a* of the process cartridge shutter 515 is offset from the toner receiving opening 514*c* of the connection frame 514 in the circumferential direction, the toner receiving opening 514*c* is closed by the process cartridge shutter 515.

The state where the toner receiving opening 514*c* is closed by the process cartridge shutter 515 is the state where the process cartridge shutter 515 is closed. In this state, the positions of the first recessed portions 514*d* of the connection frame 514 are coincident with the positions of the second recessed portions 515*b* of the process cartridge shutter 515 in the circumferential direction.

Figure 10B:
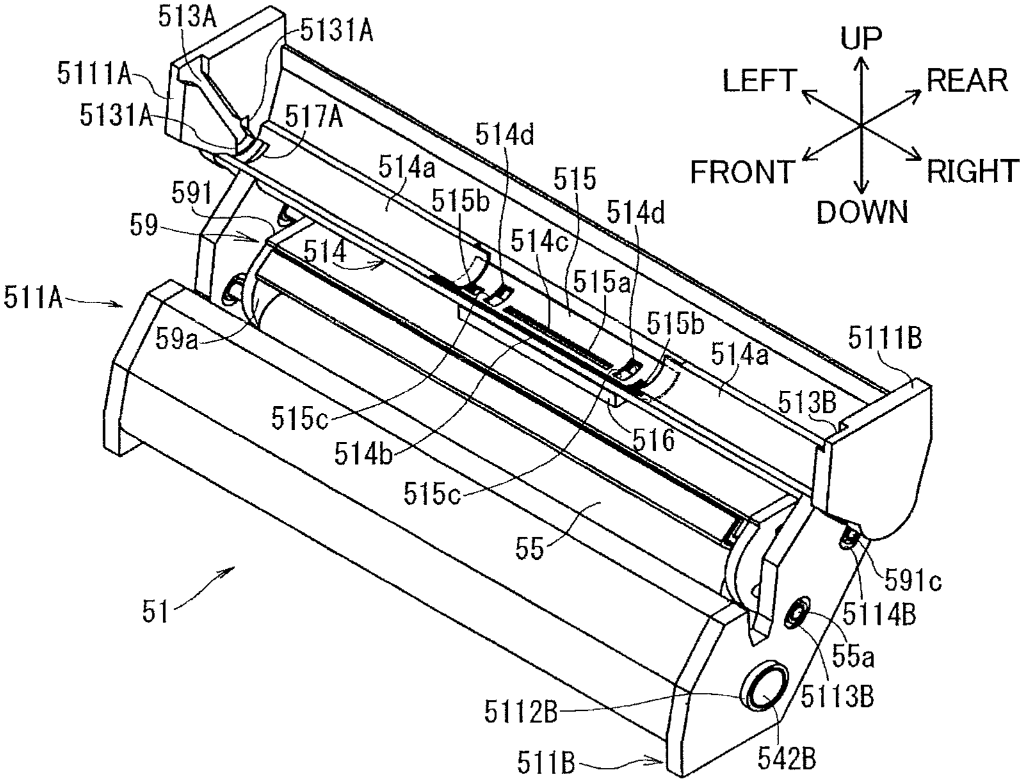
FIG. 10B is a perspective view of the process cartridge in an open state of the second shutter.

On the other hand, as illustrated in FIG. 10B, in a state where the process cartridge shutter 515 is positioned at such a sliding position that the position in the circumferential direction of the communication opening 515*a* of the process cartridge shutter 515 is coincident with that of the toner receiving opening 514*c* of the connection frame 514, the toner receiving opening 514*c* is in communication with the communication opening 515*a* and thus the toner receiving opening 514*c* is opened by the process cartridge shutter 515.

The state where the toner receiving opening 514*c* is opened by the process cartridge shutter 515 is the state where the process cartridge shutter 515 is open. In this state, the positions of the second recessed portions 515*b* of the process cartridge shutter 515 are different from the positions of the first recessed portions 514*d* of the connection frame 514 in the circumferential direction, and the second recessed portions 515*b* are positioned frontward of the first recessed portions 514*d*.

In this way, in the process cartridge 51, by slidingly moving the process cartridge shutter 515 relative to the connection frame 514 to change the sliding position of the process cartridge shutter 515 relative to the connection frame 514, opening and closing of the toner receiving opening 514*c* by the process cartridge shutter 515 can be performed.

A pair of communication holes 517A and 517B are formed in the left and right end portions of the connection frame 514. Specifically, the communication hole 517A is formed in the left end portion of the left support surface portion 514*a*, and the communication hole 517B is formed in the right end portion of the right support surface portion 514*a*. The first gear 527A and the second gear 527B of the toner cartridge 52 are inserted in the communication holes 517A and 517B, respectively, upon attachment of the toner cartridge 52 to the process cartridge 51.

[Guide Groove]

Figure 8B:
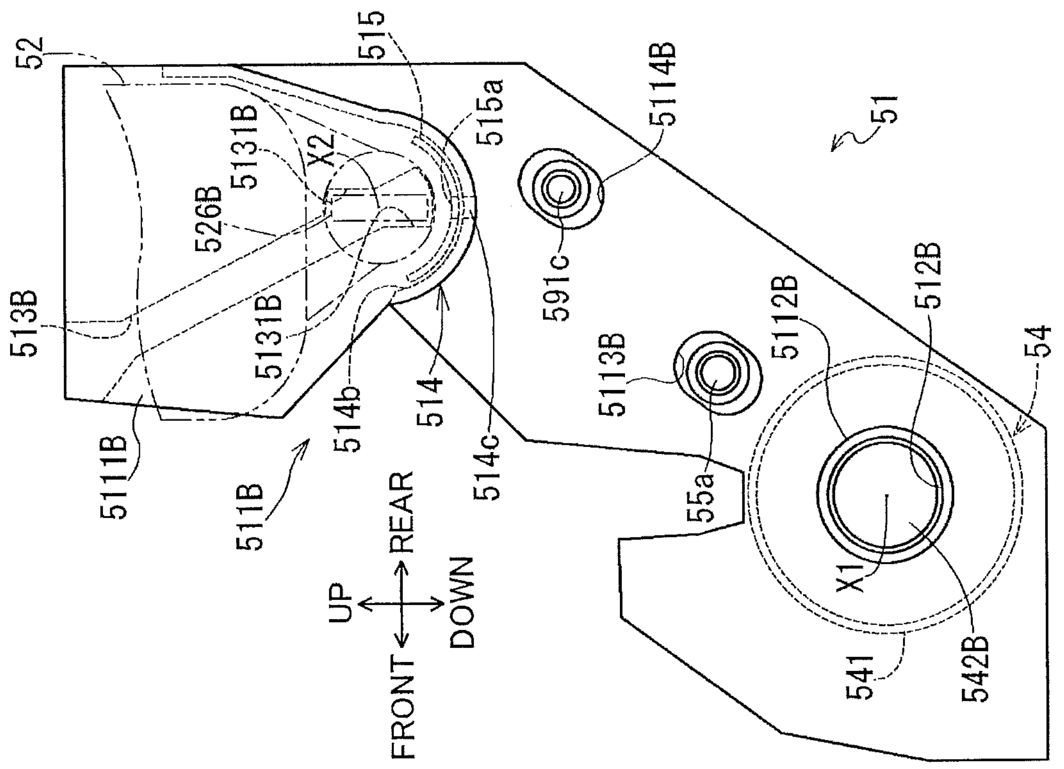
FIG. 8B is a side view of the process cartridge.
Figure 8A:
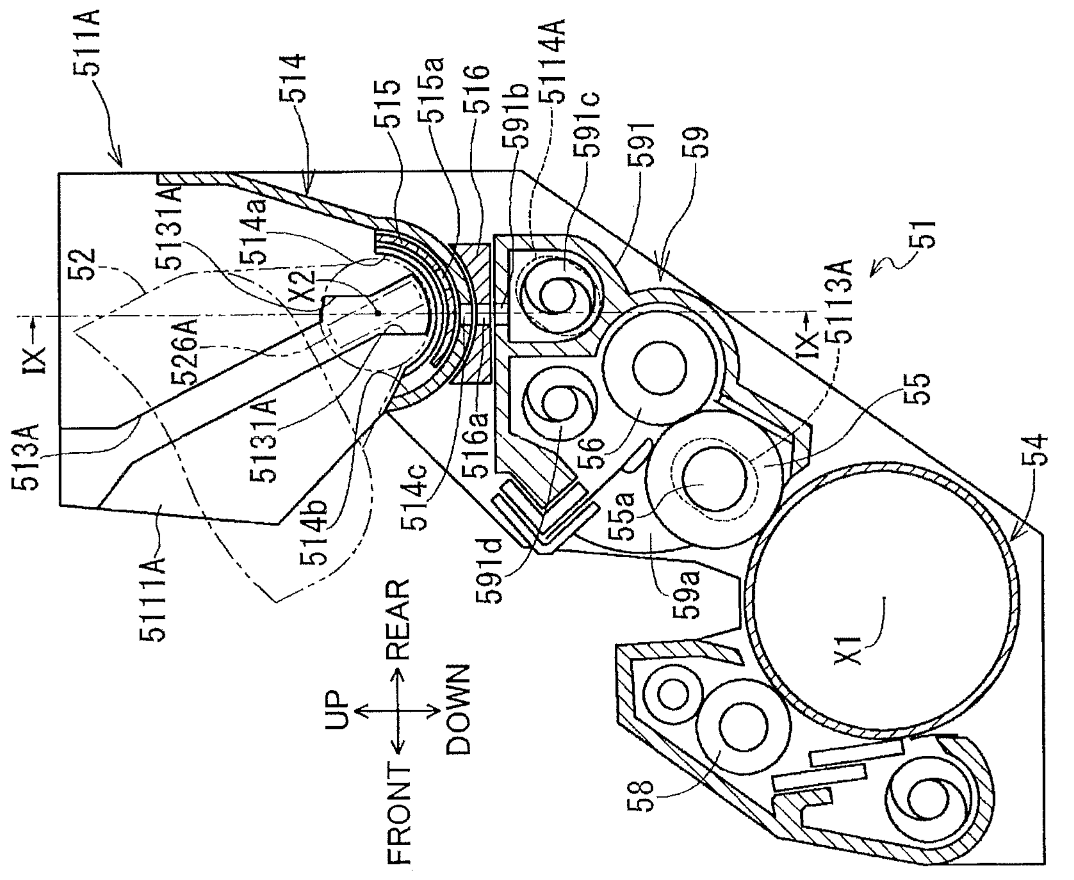
FIG. 8A is a cross-sectional side view of a process cartridge in the image forming apparatus according to the embodiment.

As illustrated in FIGS. 8A and 8B, a guide groove 513A is formed in the inner side surface in the left-right direction of the side wall portion 5111A of the left drum frame 511A, and a guide groove 513B is formed in the inner side surface in the left-right direction of the side wall portion 5111B of the right drum frame 511B. These guide grooves 513A and 513B approximately extend in the up-down direction and are inclined rearward as they extend downward. The guide grooves 513A and 513B are formed above the connection frame 514.

The guide grooves 513A and 513B have upper open ends, and accordingly, the guide protruding portions 526A and 526B of the toner cartridge 52 are insertable into the guide grooves 513A and 513B from above, respectively. The toner cartridge 52 is attachable to the process cartridge 51 by inserting the guide protruding portions 526A and 526B into the guide grooves 513A and 513B, respectively.

In a process in which the guide protruding portions 526A and 526B are inserted into the guide grooves 513A and 513B, the guide protruding portions 526A and 526B are guided along the inclined guide grooves 513A and 513B in their inclined postures in which the lower ends of the guide protruding portions 526A and 526B are positioned rearward of the upper ends of the guide protruding portions 526A and 526B.

The lower end portions of the guide grooves 513A and 513B are formed with locking grooves 5131A and 5131B, respectively. The locking grooves 5131A and 5131B are formed, respectively, by widening the groove widths of the lower end portions of the guide grooves 513A and 513B in a direction crossing the extending direction of the guide grooves 513A and 513B. When the guide protruding portions 526A and 526B inserted into the guide grooves 513A and 513B have reached the lower end portions of the guide grooves 513A and 513B (that is, the locking grooves 5131A and 5131B), respectively, the toner cartridge 52 enters the attached state in which the toner cartridge 52 is attached to the process cartridge 51.

In the attached state of the toner cartridge 52 to the process cartridge 51, the toner cartridge 52 is pivotally movable relative to the process cartridge 51 about a pivot axis X2 between an attachment/detachment position illustrated in FIG. 8A, and a fixed position illustrated in FIG. 8B. In the attachment/detachment position, the toner cartridge 52 has an inclined posture in which the toner cartridge 52 is inclined such that its upper end portion is positioned frontward of its lower end portion. In the fixed position, the toner cartridge 52 has an upright posture in which the toner cartridge 52 is upright. When the toner cartridge 52 is pivotally moved from the attachment/detachment position to the fixed position, the upper end portion of the toner cartridge 52 is moved rearward, so that the toner cartridge 52 changes its posture from the inclined posture to the upright posture. The pivot axis X2 is in parallel to the rotation axis X1 of the photosensitive drum 54. The pivot axis X2 is an example of the second pivot axis.

Specifically, pivotal movements of the guide protruding portions 526A and 526B relative to the process cartridge 51 are restricted, respectively, by the guide grooves 513A and 513B until the guide protruding portions 526A and 526B have reached the lower end portions of the guide grooves 513A and 513B. However, when the guide protruding portions 526A and 526B have reached the lower end portions of the guide grooves 513A and 513B, respectively, the guide protruding portions 526A and 526B become pivotally movable relative to the process cartridge 51 by virtue of the locking grooves 5131A and 5131B formed in the lower end portions of the guide grooves 513A and 513B.

Thus, the toner cartridge 52 can pivotally move relative to the process cartridge 51 from the attachment/detachment position to the fixed position. Note that, when the toner cartridge 52 has pivotally moved from the attachment/detachment position to the fixed position, the rear surfaces of the guide protruding portions 526A and 526B are brought into abutment with the locking grooves 5131A and 5131B, respectively, thereby preventing further rearward pivotal movement of the toner cartridge 52.

Further, the upper surfaces of the guide protruding portions 526A and 526B are in contact with the locking grooves 5131A and 5131B when the toner cartridge 52 is at the fixed position, thereby preventing the toner cartridge 52 from moving upward relative to the process cartridge 51. Hence, the toner cartridge 52 that is at the fixed position is prevented from being detached from the process cartridge 51.

In other words, the attachment/detachment position of the toner cartridge 52 is a position where the toner cartridge 52 can be attached to and detached from the process cartridge 51. The fixed position of the toner cartridge 52 is a position where the toner cartridge 52 is fixed to the process cartridge 51.

[Developing Unit]

The developing frame 591 of the developing unit 59 includes a developing chamber 59*a* in which the developing roller 55 and the supply roller 56 are accommodated. The developing roller 55 includes a roller shaft 55*a* protruding outward from the developing frame 591 in left-right direction (see FIG. 3).

Guide holes 5113A and 5113B are formed in the side wall portions 5111A and 5111B, respectively. The left end portion of the roller shaft 55*a* is inserted in the guide hole 5113A, and the right end portion of the roller shaft 55*a* is inserted in the guide hole 5113B. Each of the guide holes 5113A and 5113B is in a form of an elongated slot. The roller shaft 55*a* is slidably movable relative to the guide holes 5113A, 5113B in a direction in which the major axes of the guide holes 5113A and 5113B extend.

The major axis of each of the guide holes 5113A and 5113B is directed in a direction in which the roller shaft 55*a* is brought close to and separated from the photosensitive drum 54. The roller shaft 55*a* is slidably movable within the guide holes 5113A and 5113B.

The roller shaft 55*a* can slidingly move within the guide holes 5113A and 5113B, so that the developing frame 591 is movable in a pressure contact direction and in a separation direction. The pressure contact direction is a direction for bringing the developing roller 55 into pressure contact with the photosensitive drum 54. The separation direction is a direction for separating the developing roller 55 from the photosensitive drum 54.

Figure 9:
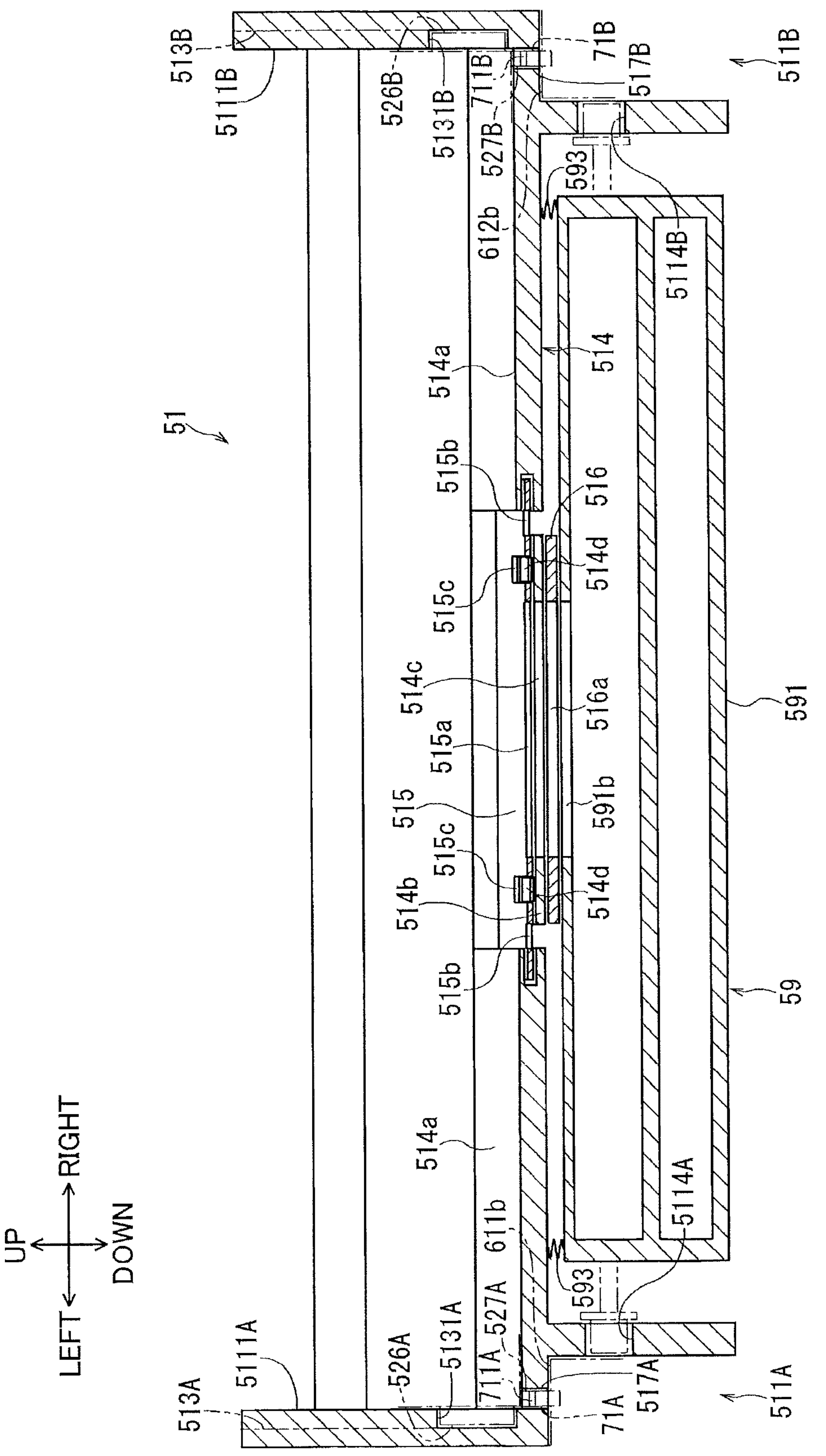
FIG. 9 is a cross-sectional view of the process cartridge taken along the line IX-IX in FIG. 8A.

An urging spring 593 is interposed between the developing frame 591 and the connection frame 514 as illustrated in FIG. 9. The developing roller 55 is urged by the urging spring 593 in the pressure contact direction (i.e., toward the photosensitive drum 54 for the pressure contact).

The upper wall of the developing frame 591 is formed with an opening 591*b* that is an elongated slot extending in the left-right direction. The opening 591*b* is positioned below the toner receiving opening 514*c* of the connection frame 514. The opening 591*b* has a size in conformance with that of the toner receiving opening 514*c*.

The opening 591*b* and the toner receiving opening 514*c* are overlapped with each other as viewed in the up-down direction (i.e., as viewed from above or below), and are communicated with each other. The opening 591*b* and the toner receiving opening 514*c* are configured to allow toner to pass therethrough for supplying the toner to the developing unit 59. Toner can be supplied to the inside of the developing frame 591 through the toner receiving opening 514*c* and the opening 591*b* in a state where the process cartridge shutter 515 is open. The developing frame 591 can accommodate therein toner.

Screws 591*c* and 591*d* are disposed in the developing frame 591. Toner supplied to the inside of the developing frame 591 is supplied to the supply roller 56 positioned in the developing chamber 59*a*. In this way, the developing unit 59 has the opening 591*b* for receiving toner to be supplied to the developing chamber 59*a*.

The screw 591*c* protrudes from the developing frame 591 outward in the left-right direction. The left end portion of the screw 591*c* protrudes from the developing frame 591 in the leftward direction, and the right end portion of the screw 591*c* protrudes from the developing frame 591 in the rightward direction. The side wall portions 5111A and 5111B are formed with guide holes 5114A and 5114B, respectively. The left and right end portions of the screw 591*c* are inserted in the guide holes 5114A and 5114B. Each of the guide holes 5114A and 5114B is in form of an elongated slot. The screw 591*c* is slidably movable in a direction in which the major axes of the guide holes 5114A and 5114B extend.

In this way, the roller shaft 55*a* is supported by the guide holes 5113A and 5113B so as to be slidably movable relative to the same and the screw 571*c* is supported by the guide holes 5114A and 5114B so as to be slidably movable relative to the same. As a result, the developing frame 591 is supported by the drum frames 511A and 511B so as to be reciprocatingly movable relative to the same.

As described above, the developing frame 591 is supported by the drum frames 511A and 511B so as to be reciprocatingly movable relative to the same. Therefore, the developing roller 55 supported by the developing frame 591 is also reciprocatingly movable relative to the photosensitive drum 54, thereby stabilizing the pressure contact state of the developing roller 55 with the photosensitive drum 54.

Further, the moving direction of the developing roller 55 that is moved together with the developing frame 591 is restricted to the following directions by the guide holes 5114A and 5114B: the pressure contact direction in which the developing roller 55 is brought into pressure contact with the photosensitive drum 54; and the separation direction in which the developing roller 55 is separated from the photosensitive drum 54. Accordingly, the positions of both end portions of the developing roller 55 can be prevented from being shifted in the circumferential direction of the photosensitive drum 54, thereby maintaining the parallelism between the developing roller 55 and the photosensitive drum 54.

[Seal Member]

A seal member 516 is interposed between the upper surface of the developing frame 591 and the opening/closing surface portion 514*b* of the connection frame 514. The seal member 516 is formed with a communication opening 516*a* that is an elongated slot extending in the left-right direction. The communication opening 516*a* has a size in conformance with the size of the toner receiving opening 514*c* of the opening/closing surface portion 514*b*.

The communication opening 516*a* is at a position overlapping with the toner receiving opening 514*c* and the opening 591*b* as viewed in the up-down direction (i.e., as viewed from above or below), and is communicated with both the toner receiving opening 514*c* to communicate with the opening 591*b*.

A gap in the up-down direction is formed provided between the upper surface of the developing frame 591 and the opening/closing surface portion 514*b*. The gap is filled with the seal member 516. Specifically, since the communication opening 516*a* is formed in the seal member 516, a gap between a peripheral edge portion of the opening portion 591*b* in the upper surface of the developing frame 591 and a peripheral edge portion of the toner receiving opening 514*c* in the opening/closing surface portion 514*b* is filled with the seal member 516. That is, the seal member

516 is provided between the peripheral edge portions of the opening 591*b* and the toner receiving opening 514*c*.

The seal member 516 is made of elastic material, for example, a sponge, and hence is expandable and shrinkable because of elastic deformation. Accordingly, even when the size of the gap between the developing frame 591 and the opening/closing surface portion 514*b* is changed due to reciprocating movement of the developing frame 591 relative to the drum frames 511A and 511B, the elastic deformation of the seal member 516 can follow the change in the size of the gap to thereby keep the gap filled.

With the above configuration, toner passing through the toner receiving opening 514*c* can be prevented from leaking through the gap between the developing frame 591 and the opening/closing surface portion 514*b*.

<Opening/Closing Operations of Shutters>

Figure 11:
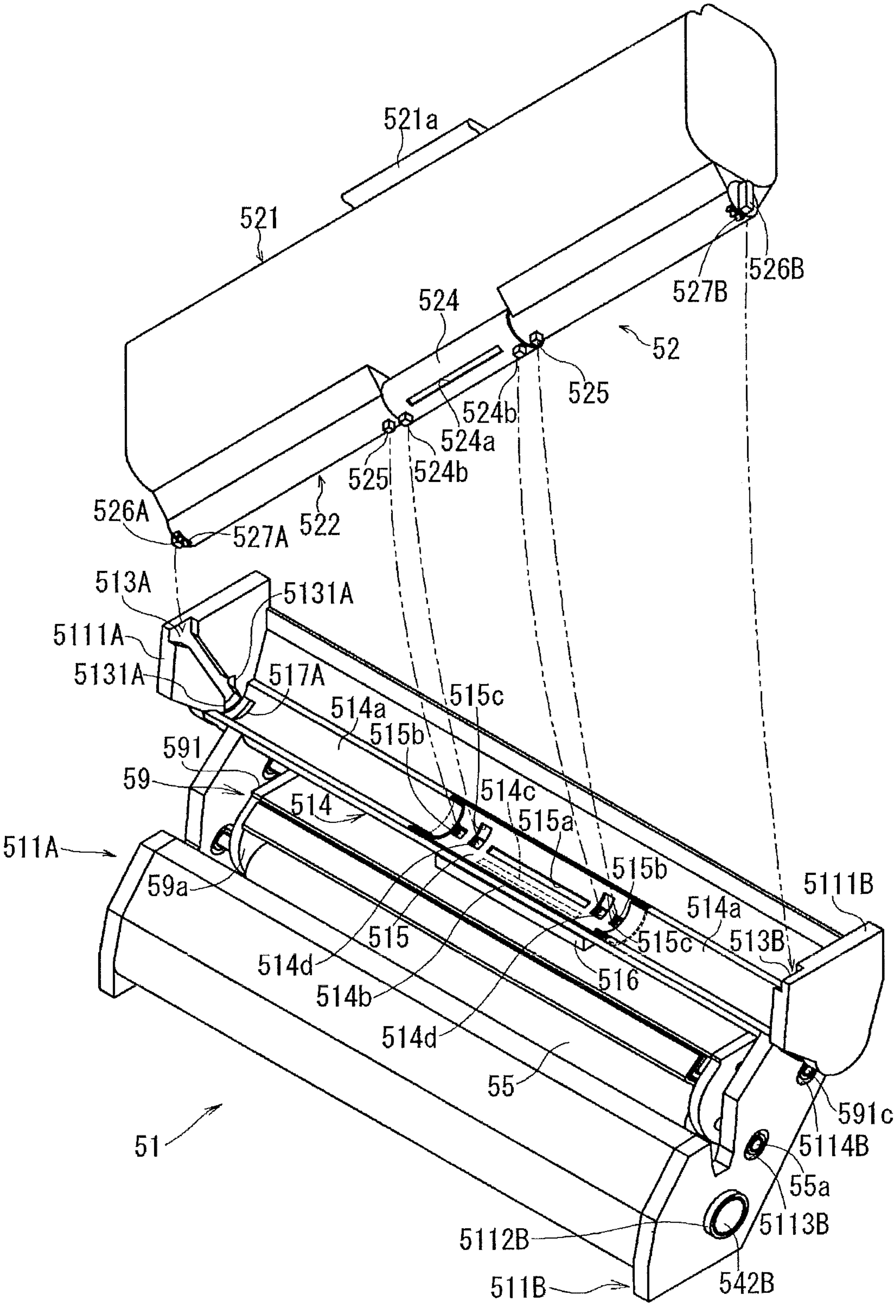
FIG. 11 is a perspective view illustrating a process of attachment of the toner cartridge to the process cartridge, and particularly illustrating fitting of a first protruding portion and a second protruding portion with a first recessed portion and a second recessed portion, respectively.

As illustrated in FIG. 11, in a state where the toner cartridge 52 is detached from the process cartridge 51, the toner cartridge shutter 524 is at the closed position and the process cartridge shutter 515 is closed.

When the guide protruding portions 526A and 526B of the toner cartridge 52 are inserted respectively into the guide grooves 513A and 513B of the side wall portions 5111A and 5111B from this state, the toner cartridge 52 is guided with its inclined posture, and then the guide protruding portions 526A and 526B reach the lower end portions of the guide grooves 513A and 513B, respectively. As a result, the toner cartridge 52 is attached to the process cartridge 51.

At this time, the first protruding portions 524*b* of the toner cartridge shutter 524 are fitted in the first recessed portions 514*d* of the opening/closing surface portion 514*b* of the connection frame 514 of the process cartridge 51, and at the same time, the second protruding portions 525 of the toner cartridge 52 are fitted in the second recessed portions 515*b* of the process cartridge shutter 515.

Figure 12B:
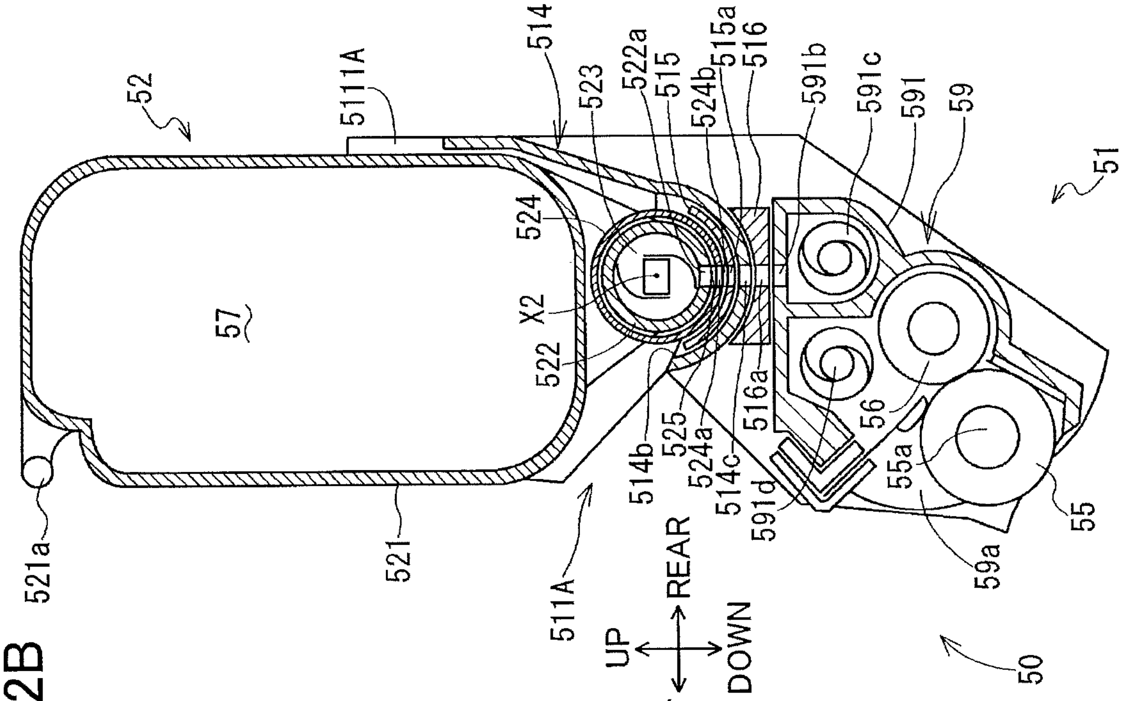
FIG. 12B is a cross-sectional side view illustrating a fixed position of the toner cartridge attached to the process cartridge.
Figure 12A:
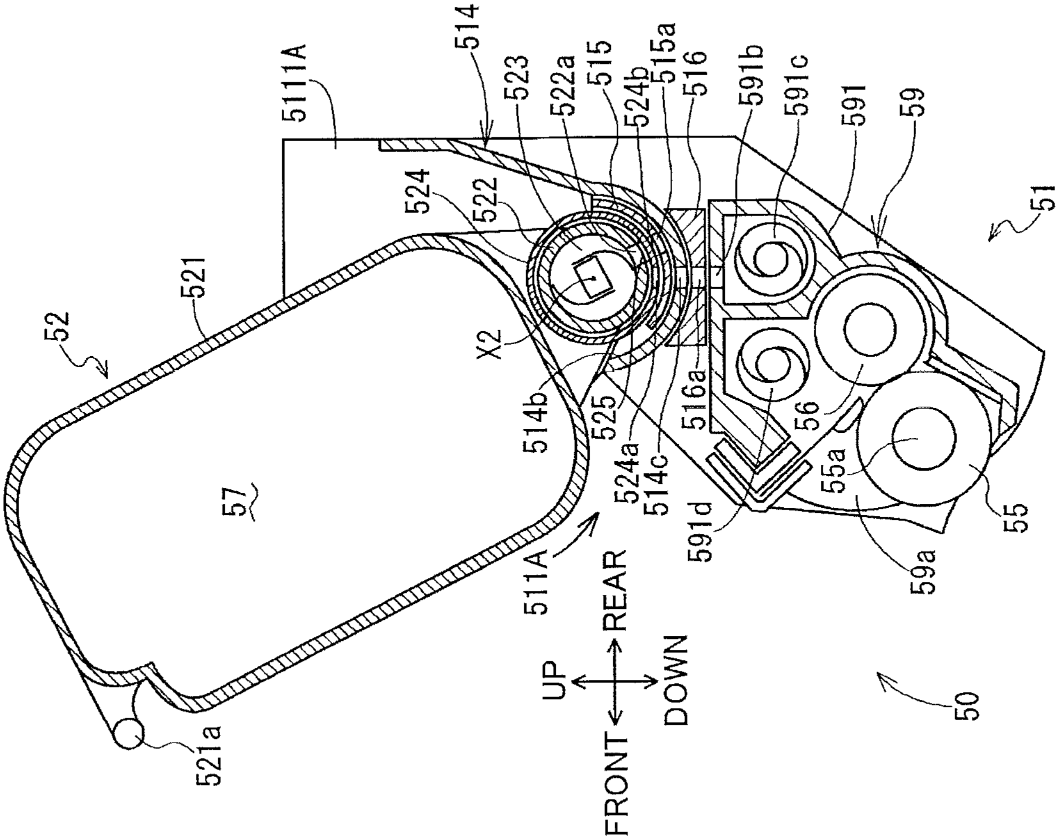
FIG. 12A is a cross-sectional side view illustrating an attachment/detachment position of the toner cartridge attached to the process cartridge.

Further, as a result of the insertion of the guide protruding portions 526A and 526B into the guide grooves 513A and 513B, respectively, the toner cartridge 52 is attached to the process cartridge 51 in a state where the toner cartridge 52 is at the attachment/detachment position, as illustrated in FIG. 12A.

The toner cartridge 52 attached to the process cartridge 52 is pivotally movable relative to the process cartridge 52 about the pivot axis X2 that is also the rotation axis of the connecting portion 522. Hence, when the toner cartridge 52 is pivotally moved rearward from the attachment/detachment portion, the toner cartridge 52 can be moved to the fixed position, as illustrated in FIG. 12B.

In the process unit 50, the toner cartridge shutter 524 and the process cartridge shutter 515 can be opened and closed by pivotally moving the toner cartridge 52 attached to the process cartridge 51 between the attachment/detachment position and the fixed position.

As illustrated in FIG. 12A, in a state where the toner cartridge 52 attached to the process cartridge 51 is at the attachment/detachment position, the toner supply opening 522*a* of the toner cartridge casing 521 is positioned rearward of the communication opening 524*a* of the toner cartridge shutter 524, and accordingly, the toner cartridge shutter 524 is at the closed position. Further, the communication opening 515*a* of the process cartridge shutter 515 is positioned rearward of the toner receiving opening 514*c* of the opening/closing surface portion 514*b* of the connection frame 514, and accordingly, the process cartridge shutter 515 is closed.

When the toner cartridge 52 is pivotally moved relative to the process cartridge 51 from the attachment/detachment position (the state illustrated in FIG. 12A) to the fixed position, the toner cartridge 52 and the toner cartridge shutter 524 are relatively moved in the circumferential direction and at the same time, the process cartridge 51 and the process cartridge shutter 515 are relatively moved in the circumferential direction. As a result, the toner cartridge shutter 524 is moved to the open position, and the process cartridge shutter 515 is opened.

Specifically, as a result of pivotal movement of the toner cartridge 52 from the attachment/detachment position to the fixed position, the toner supply opening 522*a* of the toner cartridge casing 521 is moved frontward. On the other hand, the toner cartridge shutter 524 does not move in the circumferential direction because movement in the circumferential direction of the toner cartridge shutter 524 is prevented by the engagement between the first protruding portions 524*b* of the toner cartridge shutter 524 and the first recessed portions 514*d* of the connection frame 514 of the process cartridge 51.

Accordingly, the toner supply opening 522*a* of the toner cartridge casing 521 and the communication opening 524*a* of the toner cartridge shutter 524 are relatively moved in the circumferential direction, so that the toner supply opening 522*a* and the communication opening 524*a* overlap with each other as viewed in the up-down direction (i.e., the toner supply opening 522*a* is brought into linear alignment with the communication opening 524*a* in the up-down direction). As a result, the toner supply opening 522*a* and the communication opening 524*a* are communicated with each other, and thus the toner cartridge shutter 524 is opened. In other words, the toner cartridge shutter 524 is moved to the open position to open the toner supply opening 522*a*.

Further, as a result of the pivotal movement of the toner cartridge 52 from the attachment/detachment position to the fixed position, the second protruding portions 525 of the toner cartridge casing 521 is moved frontward. The process cartridge shutter 515 is also moved frontward along with the second protruding portions 525 because of the engagement of the second protruding portions 525 with the second recessed portions 515*b* of the process cartridge shutter 515. On the other hand, the opening/closing surface portion 514*b* of the connection frame 514 of the process cartridge 51 does not move.

Therefore, the communication opening 515*a* of the process cartridge shutter 515 and the toner receiving opening 514*c* of the opening/closing surface portion 514*b* are relatively moved in the circumferential direction, so that the communication opening 515*a* and the toner receiving opening 514*c* overlap with each other as viewed in the up-down direction (i.e., the communication opening 515*a* is brought into linear alignment with the toner receiving opening 514*c* in the up-down direction). As a result, the communication opening 515*a* and the toner receiving opening 514*c* are communicated with each other, and thus the process cartridge shutter 515 is opened.

Reversely, when the toner cartridge 52 is pivotally moved relative to the process cartridge 51 from the fixed position to the attachment/detachment position, the toner cartridge 52 and the toner cartridge shutter 524 are relatively moved in circumferential direction, whereby the toner cartridge shutter 524 is closed. In other words, the toner cartridge shutter 524 is moved to the closed position to close the toner supply opening 522*a*. Further, the process cartridge 51 and the process cartridge shutter 515 are relatively moved in the circumferential direction, whereby the process cartridge shutter 515 is closed.

In this way, in the process unit 50, the toner cartridge shutter 524 and the toner cartridge 52 are moved relative to each other by the pivotal movement of the toner cartridge 52 attached to the process cartridge 51 relative thereto, and hence, the toner cartridge shutter 524 opens and closes the toner supply opening 522*a*.

Accordingly, opening and closing of the toner supply opening 522*a* can be automatically performed by the pivotal movement of the toner cartridge 52 attached to the process cartridge 51 relative thereto, thereby enabling reduction in user's labor.

<Interlocking Mechanism>

The image forming apparatus 1 includes an interlocking mechanism 7 for moving the top cover 231 and the toner cartridges 52 in interlocking with each other. Specifically, the interlocking mechanism 7 is configured to pivotally move the toner cartridges 52 between their attachment/detachment position and their fixed position in interlocking with opening/closing motion of the top cover 231.

As illustrated in FIGS. 2, 3 and 9, the interlocking mechanism 7 includes a first rack 71A, a second rack 71B, drive gears 72A and 72B, intermediate gears 73A and 73B, actuation gears 74A and 74B, cam members 75A and 75B, and the above-described first gear 527A and second gear 527B of each of the toner cartridges 52.

Each of the first rack 71A and the second rack 71B is formed of an elongated rod-like member extending in the front-rear direction. The first rack 71A is positioned at the left end portion of the interior of the housing 2, and the second rack 71B is positioned at the right end portion of the interior of the housing 2. Specifically, the first rack 71A is supported by an upper surface 611*b* of the first side frame 611 so as to be slidably movable in the front-rear direction, and the second rack 71B is supported by an upper surface 612*b* of the second side frame 612 so as to be slidably movable in the front-rear direction.

Each of the first rack 71A and the second rack 71B is an example of the actuating portion movable in accordance with the movement of the top cover and supported by the upper surface of the side frame. Further, the first rack 71A is an example of the first end side actuating portion supported by the first side frame, and the second rack 71B is an example of the second end side actuating portion supported by the second side frame.

The first rack 71A includes four first rack gears 711A. The four first rack gears 711A are arrayed in the front-rear direction in one-to-one correspondence with the four process units 50 arrayed in the front-rear direction. Each of the four first rack gears 711A is configured to be meshingly engaged with the first gear 527A of the toner cartridge 52 of the corresponding process unit 50. The four first rack gears 711A are disposed on the upper end portion of the first rack 71A.

The second rack 71B includes four second rack gears 711B. The four second rack gears 711B are arrayed in the front-rear direction in one-to-one correspondence with the four process units 50 arrayed in the front-rear direction. Each of the four second rack gears 711B is configured to be meshingly engaged with the second gear 527B of the toner cartridge 52 of the corresponding process unit 50. The four second rack gears 711B are disposed on the upper end portion of the second rack 71B.

The toner cartridge 52 is configured to be pivotally moved about the pivot axis X2 between the attachment/detachment position and the fixed position when the first rack 71A and the second rack 71B is slidingly moved in the front-rear direction in a state where the first gear 527A and the second gear 527B are meshingly engaged with the first rack gear 711A and the second rack gear 711B, respectively.

For example, when the first rack 71A and the second rack 71B are slidingly moved frontward from the state where the toner cartridge 52 is at the attachment/detachment position, the toner cartridge 52 is pivotally moved toward the fixed position. On the other hand, when the first rack 71A and the second rack 71B are slidingly moved rearward from the state where the toner cartridge 52 is at the fixed position, the toner cartridge 52 is pivotally moved toward the attachment/detachment position.

In this way, the first gear 527A and the second gear 527B pivotally move the toner cartridge 52 between the fixed position and the attachment/detachment position by being actuated respectively by the first rack gear 711A and the second rack gear 711B that are slidingly moved in the front-rear direction.

Each of the first gear 527A and the second gear 527B is an example of the actuated portion. The first gear 527A is an example of the first end side actuated portion configured to be actuated by the first end side actuating portion. The second gear 527B is an example of the second end side actuated portion configured to be actuated by the second end side actuating portion.

The first gear 527A and the first rack 71A are positioned outward (leftward in the present embodiment) of the left drum frame 511A in the extending direction of the rotation axis X1 of the photosensitive drum 54 (in the left-right direction in the present embodiment). Further, the second gear 527B and the second rack 71B are positioned outward (rightward in the present embodiment) of the right drum frame 511B in the extending direction of the rotation axis X1 of the photosensitive drum 54 (in the left-right direction in the present embodiment).

In other words, in the extending direction of the rotation axis X1 of the photosensitive drum 54, the left drum frame 511A is positioned between: the right drum frame 511B; and the first gear 527A and first rack 71A, and the right drum frame 511B is positioned between: the left drum frame 511A; and the second gear 527B and second rack 71B.

With this construction, in the extending direction of the rotation axis X1, the interlocking mechanism 7 including the first gears 527A, the first rack 71A, the second gears 527B, and the second rack 71B can be positioned avoiding mechanical interference with the photosensitive drums 54. Further, since the interlocking mechanism 7 is positioned at each side of the toner cartridge 52 in the extending direction of the rotation axis X1 of the photosensitive drum 54, the toner cartridge 52 can be suppressed from being twisted during pivotal movement between the fixed position and the attachment/detachment position.

Further, the first rack 71A and the second rack 71B are supported by the upper surface 611*b* of the first side frame 611 and the upper surface 612*b* of the second side frame 612, respectively. In each of the four toner cartridges 52, the first gear 527A and the second gear 527B are provided at the connecting portion 522 side.

With this structure, the interlocking mechanism 7 can easily pivotally move the toner cartridge 52 between the fixed position and the attachment/detachment position in a state where the toner cartridge 52 is attached to the process cartridge 51 attached to the housing 2.

The drive gear 72A, the intermediate gear 73A, the actuation gear 74A, and the cam member 75A are provided in correspondence with the first rack 71A. The drive gear 72B, the intermediate gear 73B, the actuation gear 74B, and the cam member 75B are provided in correspondence with the second rack 71B.

The drive gears 72A and 72B are provided integrally with the top cover 231, so that the drive gears 72A and 72B are configured to pivotally move about the pivot shaft 231*a* integrally with the top cover 231 when the top cover 231 is pivotally moved about the pivot shaft 231*a*.

The intermediate gears 73A and 73B are rotatably supported by the housing 2, and are in meshing engagement with the drive gears 72A and 72B, respectively. The actuation gears 74A and 74B are rotatably supported by the housing 2, and are in meshing engagement with the intermediate gears 73A and 73B, respectively.

The cam members 75A and 75B are fixed to the actuation gears 74A and 74B, respectively. Hence, the cam members 75A and 75B are pivotally movable integrally with the actuation gears 74A and 74B, respectively. The cam members 75A and 75B are formed with arcuate cam grooves 751A and 751B, respectively. The arcuate cum groove 751A has a first end portion 7511A and a second end portion 7512A in the circumferential direction of the arcuate cum groove 751A. The arcuate cum groove 751B has a first end portion 7511B and a second end portion 7512B in the circumferential direction of the arcuate cum groove 751B.

Engagement pins 712A and 712B protrude in the left-right direction from the rear end portions of the first rack 71A and the second rack 71B, respectively. Specifically, the engagement pin 712A protrudes leftward from the rear end portion of the first rack 71A, and the engagement pin 721B protrudes rightward from the rear end portion of the second rack 71B. The engagement pins 712A and 712B are slidably engaged with the cam grooves 751A and 751B, respectively.

As illustrated in FIG. 2, in a state where the top cover 231 is positioned at the first position where the top cover 231 closes the opening 2A, the engagement pins 712A and 712B are positioned at the first end portions 7511A and 7511B of the cam grooves 751A and 751B, respectively. In this state, the first rack 71A and the second rack 71B are positioned at their frontward positions and the toner cartridge 52 is positioned at the fixed position.

Further, in a state where the process cartridge 51 is attached to the housing 2, the toner cartridge 52 is attached to the process cartridge 51, and the top cover 231 is at the first position, the toner cartridge 52 is supported by the support surface portions 514*a* of the connection frame 514 of the process cartridge 51 so as to have such a posture that the toner accommodating portion 57 of the toner cartridge 52 is positioned closer to the top cover 231 than the connecting portion 522 is to the top cover 231 and the connecting portion 522 is positioned closer to the support surface portions 514*a* than the toner accommodating portion 57 is to the support surface portions 514*a*.

Figure 13:
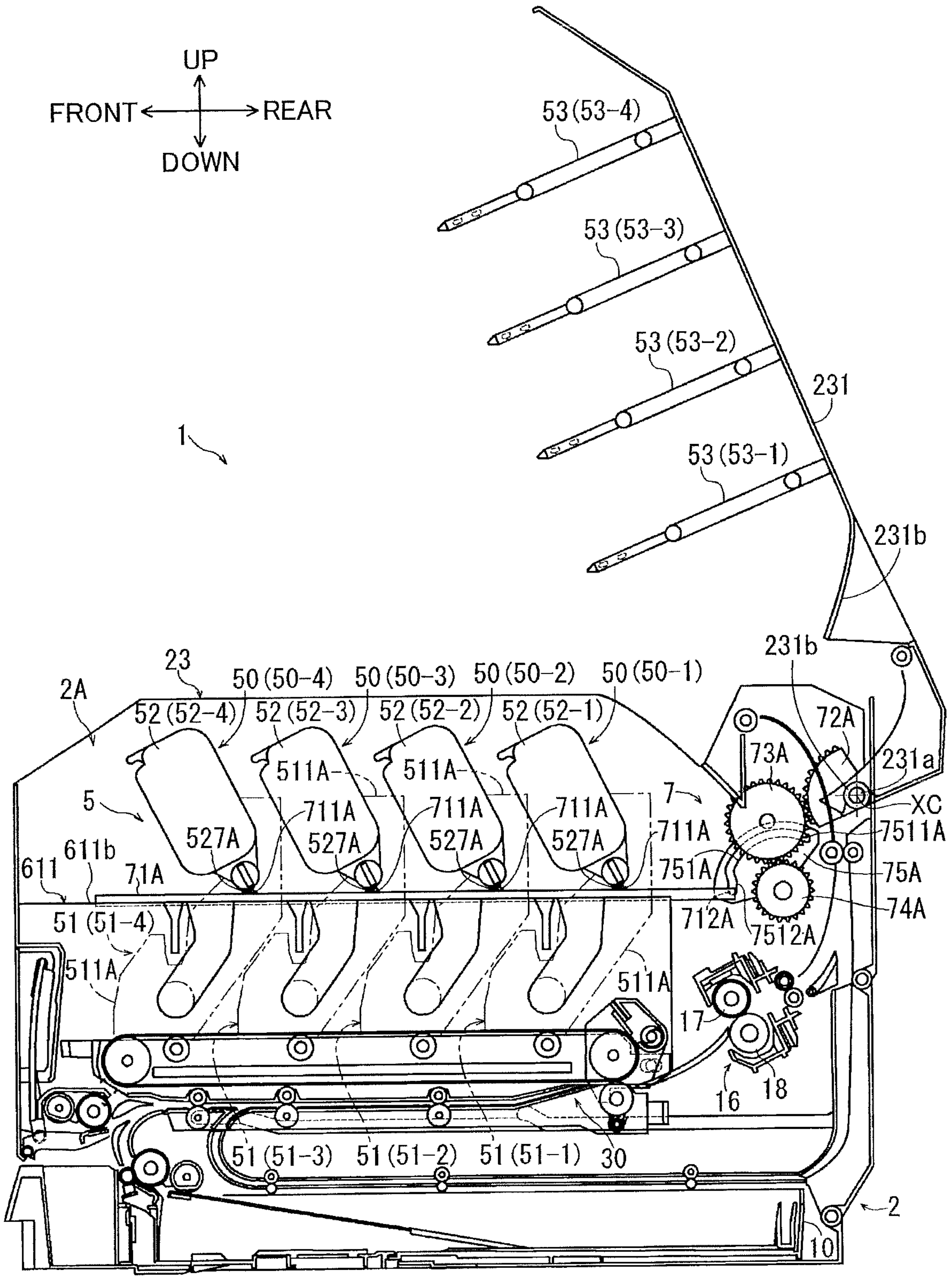
FIG. 13 is a cross-sectional side view of the image forming apparatus where the top cover is at a second position.

When the top cover 231 is pivotally moved from this state, i.e., when the top cover 231 is pivotally moved about the pivot shaft 231*a* from the first position to the second position as illustrated in FIG. 13, the intermediate gears 73A and 73B and the actuation gears 74A and 74B are rotated by the drive gears 72A and 72B pivotally moved along with the top cover 231, respectively. Upon the rotations of the actuation gears 74A and 74B, the cam members 75A and 75B is pivotally moved integrally with the actuation gears 74A and 75B, respectively. As a result, the engagement pins 712A and 712B are slidingly moved along the cam grooves 751A and 751B from the first end portions 7511A and 7511B to the second end portions 7512A and 7512B, respectively.

When the engagement pins 712A and 712B reach the second end portions 7512A and 7512B of the cam grooves 751A and 751B, the first rack 71A and the second rack 71B are pulled rearward and slidingly moved because of the shape of the cam grooves 751A and 751B, respectively. The sliding movement of the first rack 71A and the second rack 71B rearward causes the toner cartridge 52 to pivotally move from the fixed position to the attachment/detachment position.

Reversely, when the top cover 231 is pivotally moved from the second position to the first position, the cam members 75A and 75B are pivotally moved together with the top cover 231, so that the engagement pins 712A and 712B are slidingly moved along the cam grooves 751A and 751B from the second end portions 7512A and 7512B to the first end portions 7511A and 7511B, respectively. As a result of the sliding movement of the engagement pins 712A and 712B to the first end portions 7511A and 7511B of the cam grooves 751A and 751B, the first rack 71A and the second rack 71B are pushed frontward and slidingly moved because of the shape of the cam grooves 751A and 751B, respectively. The sliding movement of the first rack 71A and the second rack 71B frontward causes the toner cartridge 52 to pivotally move from the attachment/detachment position to the fixed position.

As described above, in the image forming apparatus 1, the interlocking mechanism 7 is configured to pivotally move the toner cartridge 52 from the fixed position to the attachment/detachment position when the top cover 231 is moved from the first position to the second position, and to pivotally move the toner cartridge 52 from the attachment/detachment position to the fixed position when the top cover 231 is moved from the second position to the first position.

Further, the process cartridge shutter 515 is configured to be moved from the open position to the closed position when the toner cartridge 52 is pivotally moved from the fixed position to the attachment/detachment position, and to be moved from the closed position to the open position when the toner cartridge 52 is pivotally moved from the attachment/detachment position to the fixed position.

In this way, by the movement of the top cover 231 from the first position to the second position, the toner cartridge 52 is pivotally moved from the fixed position to the attachment/detachment position and the process cartridge shutter 515 is moved from the open position to the closed position. Hence, by the movement of the top cover 231 to the second position, dispersion of toner through the toner supply opening 522*a* of the toner cartridge 52 can be suppressed and the replacement of the toner cartridge 52 can be easily performed while the process cartridge 51 is attached to the housing 2.

Further, the interlocking mechanism 7 includes the first rack 71A and the second rack 71B, and the first gear 527A and the second gear 527B. The first rack 71A and the second rack 71B moves in accordance with movement of the top cover 231. The first gear 527A and the second gear 527B are in meshing engagement with the first rack 71A and the second rack 71B and are thus actuated by the first rack 71A and the second rack 71B, respectively. The first rack 71A and the second rack 71B pivotally move the toner cartridge 52 between the fixed position and the attachment/detachment position by being actuated by the first rack 71A and the second rack 71B, respectively. Hence, the interlocking mechanism 7 can be simplified in structure, and facilitated pivotal movement of the toner cartridge 52 between the fixed position and the attachment/detachment position can be attained.

Further, as illustrated in FIGS. 2 and 13, the pivot shaft 231*a* of the top cover 231 extends parallel to the rotation axis X1 of the photosensitive drum 54. Further, in a state where the process cartridge 51 is attached to the housing 2, the toner cartridge 52 is attached to the process cartridge 51, and the toner cartridge 52 is positioned at the attachment/detachment position, the toner cartridge 52 has a posture in which the toner cartridge 52 is inclined in a direction farther away from the pivot shaft 231*a* than the toner cartridge 52 at the fixed position is form the pivot shaft 231*a*. Hence, when the user opens the top cover 231 to move the same to the second position, the toner cartridge 52 is pivotally moved to the attachment/detachment position, so that the toner cartridge 52 is inclined in a direction away from the pivot shaft 231*a*. Accordingly, the toner cartridge 52 can be easily detached from the process cartridge 51.

Further, in the image forming apparatus 1, the interlocking mechanism 7 pivotally moves the toner cartridge 52 between the attachment/detachment position and the fixed position when the top cover 231 is moved between the first position and the second position. However, since the developing frame 591 supporting the developing roller 55 is reciprocatingly movably supported by the drum frames 511A and 511B of the process cartridge 51, contacting state between the photosensitive drum 54 and the developing roller 55 can be prevented from being affected by the interlocking mechanism 7.

<Layout of the Plurality of Process Units>

Here, as illustrated in FIGS. 1, 2 and 13, of the four process units 50 in the image forming unit 5, the process unit 50 which is positioned rearmost in the front-rear direction will be referred to as a first process unit 50-1, the process unit 50 which is positioned frontward of the first process unit 50-1 will be referred to as a second process unit 50-2, the process unit 50 which is positioned frontward of the second process unit 50-2 will be referred to as a third process unit 50-3, and the process unit 50 which is positioned frontward of the third process unit 50-3 will be referred to as a fourth process unit 50-4.

In other words, the first process unit 50-1 is positioned closest to the pivot shaft 231*a* in the front-rear direction. The second process unit 50-2 is positioned farther from the pivot shaft 231*a* in the front-rear direction than the first process unit 50-1 is from the pivot shaft 231*a*. The third process unit 50-3 is positioned farther from the pivot shaft 231*a* in the front-rear direction than the second process unit 50-2 is from the pivot shaft 231*a*. The fourth process unit 50-4 is positioned farther from the pivot shaft 231*a* in the front-rear direction than the third process unit 50-3 is from the pivot shaft 231*a*.

The process cartridge 51 and the toner cartridge 52 which are possessed by the first process unit 50-1 will be referred to as a first process cartridge 51-1 and a first toner cartridge 52-1, respectively. The process cartridge 51 and the toner cartridge 52 which are possessed by the second process unit 50-2 will be referred to as a second process cartridge 51-2 and a second toner cartridge 52-2, respectively. The process cartridge 51 and the toner cartridge 52 which are possessed by the third process unit 50-3 will be referred to as a third process cartridge 51-3 and a third toner cartridge 52-3, respectively. The process cartridge 51 and the toner cartridge 52 which are possessed by the fourth process unit 50-4 will be referred to as a fourth process cartridge 51-4 and a fourth toner cartridge 52-4, respectively.

Of the four exposure heads 53 provided at the top cover 231, the exposure head 53 that exposes the photosensitive drum 54 of the first process cartridge 51-1 to light will be referred to as a first exposure head 53-1, the exposure head 53 that exposes the photosensitive drum 54 of the second process cartridge 51-2 to light will be referred to as a second exposure head 53-2, the exposure head 53 that exposes the photosensitive drum 54 of the third process cartridge 51-3 to light will be referred to as a third exposure head 53-3, and the exposure head 53 that exposes the photosensitive drum 54 of the fourth process cartridge 51-4 to light will be referred to as a fourth exposure head 53-4.

The first exposure head 53-1 is positioned frontward of the first toner cartridge 52-1 and rearward of the second toner cartridge 52-2. The second exposure head 53-2 is positioned frontward of the second toner cartridge 52-2 and rearward of the third toner cartridge 52-3. The third exposure head 53-3 is positioned frontward of the third toner cartridge 52-3 and rearward of the fourth toner cartridge 52-4. The fourth exposure head 53-4 is positioned frontward of the fourth toner cartridge 52-4.

The photosensitive drum 54 of the first process cartridge 51-1 is an example of the first photosensitive drum. The developing roller 55 of the first process cartridge 51-1 is an example of the first developing roller. The support surface portion 514*a* of the connection frame 514 of the first process cartridge 51-1 is an example of the first support portion. The rotation axis X1 of the photosensitive drum 54 of the first process cartridge 51-1 is an example of the first rotation axis.

The drum shaft 542A of the photosensitive drum 54 of the first process cartridge 51-1 is an example of the first end portion of the first photosensitive drum in the first rotation axis direction. The drum shaft 542B of the photosensitive drum 54 of the first process cartridge 51-1 is an example of the second end portion of the first photosensitive drum in the first rotation axis direction.

The left drum frame 511A of the first process cartridge 51-1 is an example of the first drum frame supporting the first end portion of the first photosensitive drum. The right drum frame 511B of the first process cartridge 51-1 is an example of the second drum frame supporting the second end portion of the first photosensitive drum.

The protruding portion 5112A of the first process cartridge 51-1 is an example of the first end of the first process cartridge. The protruding portion 5112B of the first process cartridge 51-1 is an example of the second end of the first process cartridge.

The photosensitive drum 54 of the second process cartridge 51-2 is an example of the second photosensitive drum. The developing roller 55 of the second process cartridge 51-2 is an example of the second developing roller. The support surface portion 514*a* of the connection frame 514 of the second process cartridge 51-2 is an example of the second support portion. The rotation axis X1 of the photosensitive drum 54 of the second process cartridge 51-2 is an example of the second rotation axis.

The drum shaft 542A of the photosensitive drum 54 of the second process cartridge 51-2 is an example of the third end portion of the second photosensitive drum in the second rotation axis direction. The drum shaft 542B of the photosensitive drum 54 of the second process cartridge 51-2 is an example of the fourth end portion of the second photosensitive drum in the second rotation axis direction.

The left drum frame 511A of the second process cartridge 51-2 is an example of the third drum frame supporting the third end portion of the second photosensitive drum. The right drum frame 511B of the second process cartridge 51-2 is an example of the fourth drum frame supporting the fourth end portion of the second photosensitive drum.

The protruding portion 5112A of the second process cartridge 51-2 is an example of the third end of the second process cartridge. The protruding portion 5112B of the second process cartridge 51-2 is an example of the fourth end of the second process cartridge.

The toner accommodating portion 57 of the first toner cartridge 52-1 is an example of the first toner accommodating portion. The connecting portion 522 of the first toner cartridge 52-1 is an example of the first connecting portion. The toner supply opening 522*a* of the first toner cartridge 52-1 is an example of the first toner supply opening. The toner cartridge shutter 524 of the first toner cartridge 52-1 is an example of the first shutter of the first toner cartridge. The pivot axis X2 of the first toner cartridge 52-1 is an example of the second pivot axis.

The toner accommodating portion 57 of the second toner cartridge 52-2 is an example of the second toner accommodating portion. The connecting portion 522 of the second toner cartridge 52-2 is an example of the second connecting portion. The toner supply opening 522*a* of the second toner cartridge 52-2 is an example of the second toner supply opening. The toner cartridge shutter 524 of the second toner cartridge 52-2 is an example of the second shutter of the second toner cartridge. The pivot axis X2 of the second toner cartridge 52-2 is an example of the third pivot axis.

Each of the first rack 71A and the second rack 71B is an example of the actuating portion constituted by an elongated member extending in a direction perpendicular to the first rotation axis direction of the first photosensitive drum and configured to move in accordance with the movement of the top cover. Further, each of the first rack 71A and the second rack 71B is an example of the actuating portion supported by the upper surface of the side frame. Further, the first rack 71A is an example of the first end side actuating portion supported by the first side frame, and the second rack 71B is an example of the second end side actuating portion supported by the second side frame.

Each of the first gear 527A and the second gear 527B of the first toner cartridge 52-1 is an example of the first actuated portion configured to pivotally move the first toner cartridge between the first fixed position and the first attachment/detachment position. Each of the first gear 527A and the second gear 527B of the second toner cartridge 52-2 is an example of the second actuated portion configured to pivotally move the second toner cartridge between the second fixed position and the second attachment/detachment position.

The first gear 527A of the first toner cartridge 52-1 is an example of the first end side actuated portion configured to be actuated by the first end side actuating portion. The second gear 527B of the first toner cartridge 52-1 is an example of the second end side actuated portion configured to be actuated by the second end side actuating portion.

The first gear 527A of the second toner cartridge 52-2 is an example of the third end side actuated portion configured to be actuated by the first end side actuating portion. The second gear 527B of the second toner cartridge 52-2 is an example of the fourth end side actuated portion configured to be actuated by the second end side actuating portion.

With this structure, the first process cartridge 51-1 and the second process cartridge 51-2 are arrayed in the front-rear direction perpendicular to the extending direction of the rotation axis X1 of the first process cartridge 51-1. Further, the rotation axis X1 of the photosensitive drum 54 of the first process cartridge 51-1 extends in parallel to the rotation axis X1 of the photosensitive drum 54 of the second process cartridge 51-2.

Hence, pivotal movements of both the first toner cartridge 52-1 and the second toner cartridge 52-2 between their fixed position and attachment/detachment position can be easily performed. The same is true with respect to the relationship between the second toner cartridge 52-2 and the third toner cartridge 52-3 and the relationship between the third toner cartridge 52-3 and the fourth toner cartridge 52-4.

Further, the pivot shaft 231*a* of the top cover 231 extends in parallel to the rotation axis X1 of the photosensitive drum 54 of the first process cartridge 51-1. In a state where the first process cartridge 51-1 and the second process cartridge 51-2 are attached to the housing 2, the first toner cartridge 52-1 is attached to the first process cartridge 51-1, and the second toner cartridge 52-2 is attached to the second process cartridge 51-2, the first toner cartridge 52-1 and second toner cartridge 52-2 at their attachment/detachment positions are inclined farther away from the pivot shaft 231*a* than those at their fixed positions are from the pivot shaft 231*a*.

In this way, the first toner cartridge 52-1 and the second toner cartridge 52-2 are inclined away from the pivot shaft 231*a* when the top cover 231 is opened and pivotally moved to the second position. Accordingly, the first toner cartridge 52-1 and the second toner cartridge 52-2 can be easily detached from the first process cartridge 51-1 and the second process cartridge 51-2, respectively.

Further, in a case where the second toner cartridge 52-2 is positioned farther from the pivot shaft 231*a* than the first toner cartridge 52-1 is from the pivot shaft 231*a* as in the present embodiment, when the first toner cartridge 52-1 and the second toner cartridge 52-2 are pivotally moved to the attachment/detachment position, the first toner cartridge 52-1 that has moved to the attachment/detachment position can be positioned in a part of the space occupied by the second toner cartridge 52-2 that was at the fixed position. That is, as illustrated in FIG. 2, an occupied space of the first toner cartridge 52-1 which is at the attachment/detachment position indicated by the two-dot chain line is partly overlapped with an occupied space of the second toner cartridge 52-2 which is at the fixed position.

With this arrangement, the first toner cartridge 52-1 and the second toner cartridge 52-2 can be positioned close to each other, thereby achieving reduction of the image forming apparatus 1 in size. The same is true with respect to the relationship between the second toner cartridge 52-2 and the third toner cartridge 52-3 and the relationship between the third toner cartridge 52-3 and the fourth toner cartridge 52-4.

Further, as illustrated in FIG. 2, the first exposure head 53-1 when the top cover 231 is at the first position interferes with the first toner cartridge 52-1 which is at the attachment/detachment position. In other words, as illustrated in FIG. 2, an occupied space of the first exposure head 53-1 when the top cover 231 is at the first position is partly overlapped with an occupied space of the first toner cartridge 52-1 which is at the attachment/detachment position indicated by the two-dot chain line. With this structure, the first exposure head 53-1 and the first toner cartridge 52-1 can be positioned close to each other, thereby reducing the size of the image forming apparatus 1.

The same is true with respect to the relationship between the second toner cartridge 52-2 and the second exposure head 53-2, the relationship between the third toner cartridge 52-3 and the third exposure head 53-3, and the relationship between the fourth toner cartridge 52-4 and the fourth exposure head 53-4.

Further, the first toner cartridge 52-1 which is at the attachment/detachment position interferes with the second toner cartridge 52-2 which is at the fixed position. In other words, as illustrated in FIG. 2, a space occupied by the first toner cartridge 52-1 which is at the attachment/detachment position indicated by the two-dot chain line is partly overlapped with a space occupied by the second toner cartridge 52-2 which is at the fixed position. With this structure, proximate positioning between the first toner cartridge 52-1 and the second toner cartridge 52-2 is attainable, thereby achieving reduction in size of the image forming apparatus 1.

The same is true with respect to the relationship between the second toner cartridge 52-2 and the third toner cartridge 52-3 and the relationship between the third toner cartridge 52-3 and the fourth toner cartridge 52-4.

<Modifications>

According to the belt unit 30 in the above-described image forming apparatus 1, the toner image formed on the photosensitive drum 54 is transferred to the intermediate transfer belt 31 as the primary transfer, and the transferred toner image is then transferred from the intermediate transfer belt 31 to the sheet S as the secondary transfer. However, alternatively, a belt unit may be provided in which the toner image on the photosensitive drum 54 can be directly transferred to the sheet S conveyed by a conveyer belt.

Figure 14:
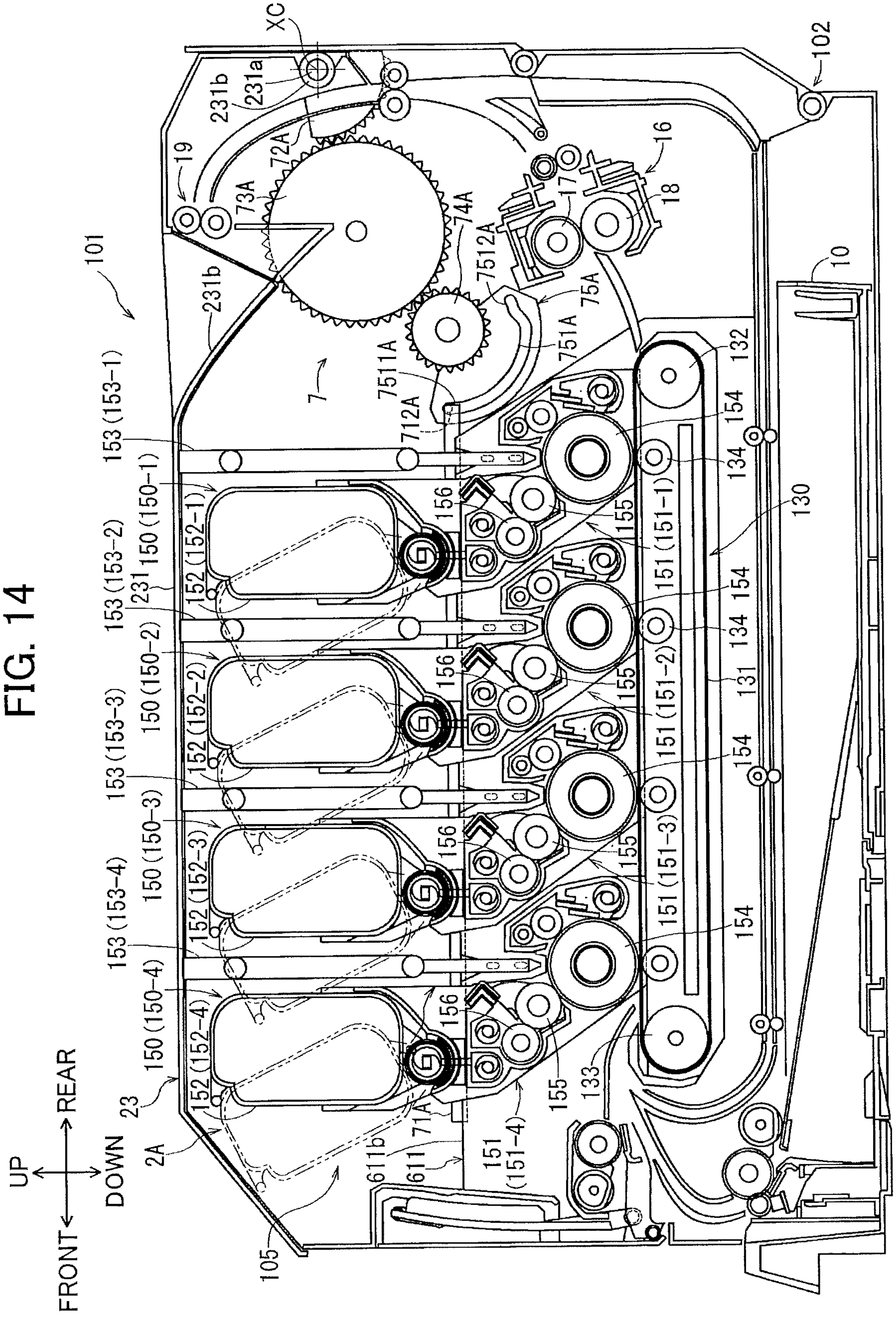
FIG. 14 is a cross-sectional side view of an image forming apparatus according to a modification where a top cover is at a first position.
Figure 15:
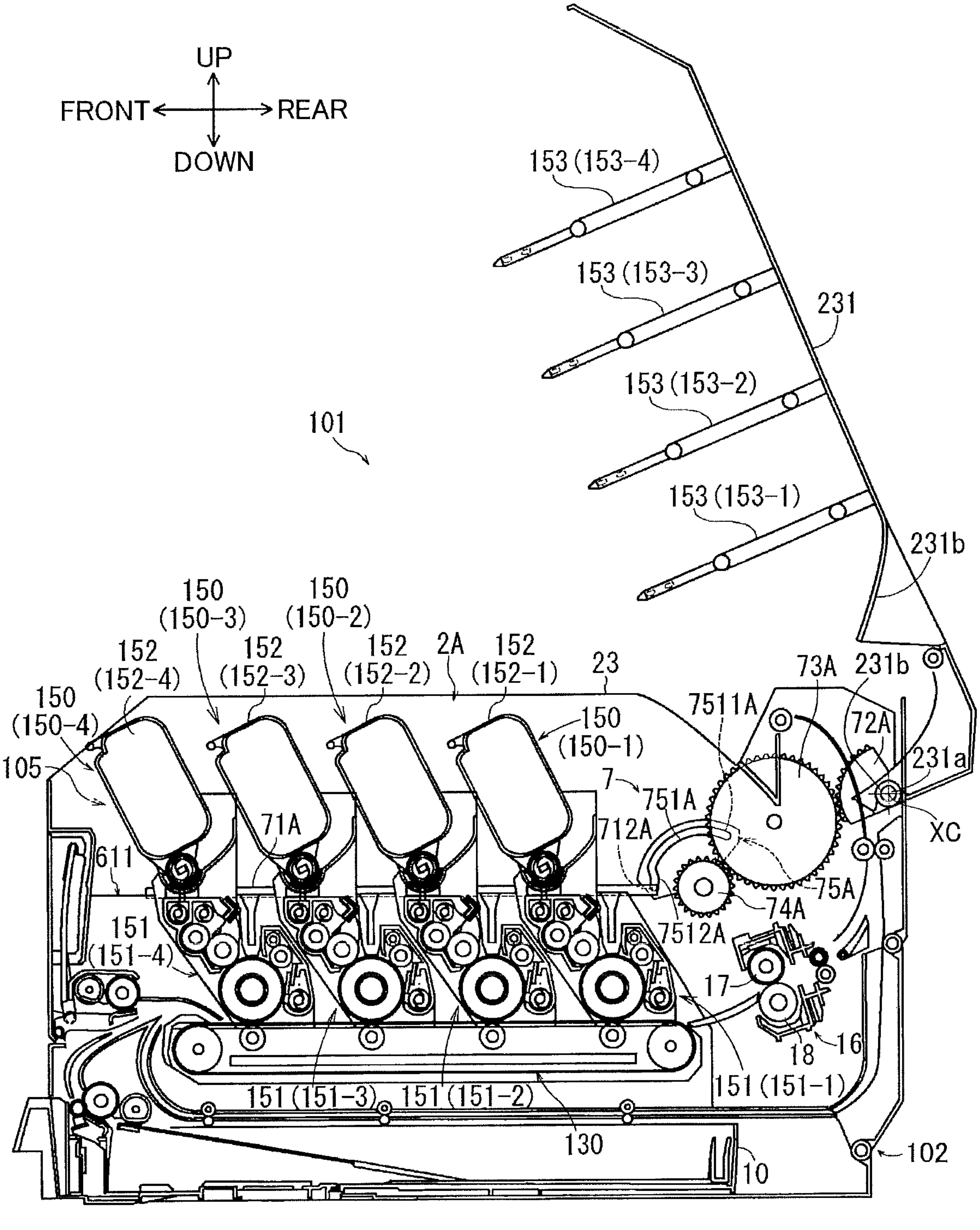
FIG. 15 is a cross-sectional side view of the image forming apparatus according to the modification where the top cover is at a second position.

Next, an image forming apparatus 101 according to a modification of the above-described embodiment while referring to FIGS. 14 and 15. The image forming apparatus 101 includes an image forming unit 105. The image forming unit 105 includes four process units 150, four exposure heads 153, and a belt unit 130. In FIGS. 14 and 15, like parts and components are designated by the same reference numerals as those shown in FIGS. 1 through 13 to avoid duplicating description.

The four process units 150 are arrayed in the front-rear direction. Each process unit 150 includes a process cartridge 151 and a toner cartridge 152. The process cartridge 51 is attachable to and detachable from the side frame of the housing 102, and includes a photosensitive drum 154, a developing roller 155 configured to contact a front upper portion of the photosensitive drum 154, and a supply roller 156 configured to contact a front upper portion of the developing roller 155.

The toner cartridge 152 is attachable to and detachable from the process cartridge 151, and includes a toner accommodating portion 157. In the attached state of the toner cartridge 152 to the process cartridge 151, the toner cartridge 152 is pivotally movable between an attachment/detachment position (the position illustrated in FIG. 15) and a fixed position (the position illustrated in FIG. 14). In the attachment/detachment position, the toner cartridge 152 has an inclined posture in which the toner cartridge 152 is inclined such that its upper end portion is positioned frontward of its lower end portion. In the fixed position, the toner cartridge 152 has an upright posture in which the toner cartridge 152 is upright. When the toner cartridge 152 is pivotally moved from the attachment/detachment position to the fixed position, the upper end portion of the toner cartridge 152 is moved rearward, so that the toner cartridge 152 changes its posture from the inclined posture to the upright posture.

The four exposure heads 153 are provided in one-to-one correspondence with the four photosensitive drums 154 of the four process cartridges 151. The four exposure heads 153 are supported by the top cover 231. The belt unit 130 includes an endless belt 131, a drive roller 132, a follower roller 133, and four transfer rollers 134. The endless belt 131 is positioned below the photosensitive drums 154 and faces the same with the sheet conveying passage P interposed therebetween. The belt 131 is looped between the drive roller 132 and the follower roller 133. Each of the four transfer rollers 134 is positioned on the opposite side of the belt 131 from the corresponding photosensitive drum 154. In other words, each of the four transfer rollers 34 is disposed below the corresponding photosensitive drum 54 and faces the same with the belt 31 interposed therebetween.

In the image forming unit 105, in a process that the sheet is conveyed by the belt 131 and moves past portions between the photosensitive drums 154 and the belt 131, toner images carried on the photosensitive drums 154 are transferred to the sheet S by the belt unit 130.

The remaining structures of the image forming apparatus 101 is the same as those of the image forming apparatus 1 described above. The toner cartridges 152 are configured to pivotally move between their attachment/detachment positions and their fixed positions by the interlocking mechanism 7 in interlocking with the opening/closing movement of the top cover 231.

Here, as illustrated in FIGS. 14 and 15, of the four process units 150 provided in the image forming unit 105, the process unit 150 which is positioned rearmost in the front-rear direction will be referred to as a first process unit 150-1, the process unit 150 which is positioned frontward of the first process unit 150-1 will be referred to as a second process unit 150-2, the process unit 150 which is positioned frontward of the second process unit 150-2 will be referred to as a third process unit 150-3, and the process unit 150 which is positioned frontward of the third process unit 150-3 will be referred to as a fourth process unit 150-4.

Similarly, of the four process cartridges 151, the process cartridge 151 which is positioned rearmost in the front-rear direction will be referred to as a first process cartridge 151-1, the process cartridge 151 which is positioned frontward of the first process cartridge 151-1 will be referred to as a second process cartridge 151-2, the process cartridge 151 which is positioned frontward of the second process cartridge 151-2 will be referred to as a third process cartridge 151-3, and the process cartridge 151 which is positioned frontward of the third process cartridge 151-3 will be referred to as a fourth process cartridge 151-4.

Similarly, of the four toner cartridges 152, the toner cartridge 152 which is positioned rearmost in the front-rear direction will be referred to as a first toner cartridge 152-1, the toner cartridge 152 which is positioned frontward of the first toner cartridge 152-1 will be referred to as a second toner cartridge 152-2, the toner cartridge 152 which is positioned frontward of the second toner cartridge 151-2 will be referred to as a third toner cartridge 152-3, and the toner cartridge 152 which is positioned frontward of the third toner cartridge 152-3 will be referred to as a fourth toner cartridge 152-4.

Moreover, of the four exposure heads 153 provided at the top cover 231, the exposure head 153 that exposes the photosensitive drum 154 of the first process cartridge 151-1 to light will be referred to as a first exposure head 153-1, the exposure head 153 that exposes the photosensitive drum 154 of the second process cartridge 151-2 to light will be referred to as a second exposure head 153-2, the exposure head 153 that exposes the photosensitive drum 154 of the third process cartridge 151-3 to light will be referred to as a third exposure head 153-3, and the exposure head 153 that exposes the photosensitive drum 154 of the fourth process cartridge 151-4 to light will be referred to as a fourth exposure head 153-4.

The first exposure head 153-1 is positioned rearward of the first toner cartridge 152-1. The second exposure head 153-2 is positioned frontward of the first toner cartridge 152-1 and rearward of the second toner cartridge 152-2. The third exposure head 153-3 is positioned frontward of the second toner cartridge 152-2 and rearward of the third toner cartridge 152-3. The fourth exposure head 153-4 is positioned frontward of the third toner cartridge 152-3 and rearward of the fourth toner cartridge 152-4.

According to the image forming apparatus 101, the second exposure head 153-2 when the top cover 231 is at the first position interferes with the first toner cartridge 152-1 which is at the attachment/detachment position. In other words, as illustrated in FIG. 14, a space occupied by the second exposure head 153-2 when the top cover 231 is at the first position is partly overlapped with a space occupied by the first toner cartridge 152-1 which is at the attachment/detachment position indicated by the two-dot chain line. With this structure, the second exposure head 153-2 and the first toner cartridge 152-1 can be positioned close to each other, thereby achieving reduction in size of the image forming apparatus 1.

The same is true with respect to the relationship between the third exposure head 153-3 and the second toner cartridge 152-2, and the relationship between the fourth exposure head 153-4 and the third toner cartridge 152-3.

Further, according to the image forming apparatus 101, the first toner cartridge 152-1 which is at the attachment/detachment position interferes with the second toner cartridge 152-2 which is at the fixed position. In other words, as illustrated in FIG. 14, an occupied space of the first toner cartridge 152-1 which is at the attachment/detachment position indicated by the two-dot chain line is partly overlapped with an occupied space of the second toner cartridge 152-2 which is at the fixed position. With this structure, proximate positioning between the first toner cartridge 152-1 and the second toner cartridge 152-2 is attainable, thereby achieving reduction of the image forming apparatus 1 in size.

The same is true with respect to the relationship between the second toner cartridge 152-2 and the third toner cartridge 152-3, and the relationship between the third toner cartridge 152-3 and the fourth toner cartridge 152-4.

While the description has been made in detail with reference to the specific embodiment and its modifications, it would be apparent to those skilled in the art that various changes and modifications may be made thereto.

What is claimed is:

1. A process cartridge comprising:

a photosensitive drum rotatable about a drum axis extending in a left-right direction;

a developing unit comprising a developing roller and a developing frame supporting the developing roller; and a process cartridge frame comprising:

a connection frame extending in the left-right direction:

a first left side wall disposed on a first side of the connection frame, the first left side wall being connected to a left end portion of the connection frame, the first left side wall being configured to support a left end portion of a toner cartridge storing toner;

a first right side wall disposed on the first side of the connection frame, the first right side wall being connected to a right end portion of the connection frame, the first right side wall being configured to support a right end portion of the toner cartridge;

a second left side wall disposed on a second side of the connection frame, the second left side wall supporting a left end portion of the developing unit; and a second right side wall disposed on the second side of the connection frame, the first right side wall supporting a right end portion of the developing unit, wherein a distance in the left-right direction between the first left side wall and the first right side wall is longer than a distance in the left-right direction between the second left side wall and the second right side wall.

2. The process cartridge according to claim 1, wherein a seal member is interposed between the developing frame and the connection frame.

3. The process cartridge according to claim 2, wherein the toner cartridge has a toner supply opening for supplying toner, wherein the connection frame has a toner receiving opening for receiving toner supplied from the toner supply opening, wherein the developing frame has a developing frame opening, the developing frame opening being in communication with the toner receiving opening, wherein the seal member has a communication opening overlapped with both the developing frame opening and the toner receiving opening as viewed in an up-down direction, and wherein, in a case where the toner cartridge is supported between the first left side wall and the first right side wall, the toner supply opening is configured to communicate with the developing frame opening through both the toner receiving opening and the communication opening.

4. The process cartridge according to claim 1, wherein the toner cartridge has a toner supply opening for supplying toner, wherein the connection frame has a toner receiving opening for receiving toner supplied from the toner supply opening, wherein the developing frame has a developing frame opening, the developing frame opening being in communication with the toner receiving opening, and wherein, in a case where the toner cartridge is supported between the first left side wall and the first right side wall, the toner supply opening is configured to communicate with the developing frame opening through the toner receiving opening.

5. The process cartridge according to claim 1, wherein the toner cartridge is pivotally movable between:

an attachment/detachment position where the toner cartridge is attachable to and detachable from the process cartridge; and a fixed position where the toner cartridge is fixed to the process cartridge.

6. A process cartridge comprising:

a photosensitive drum rotatable about a drum axis extending in a left-right direction;

a developing unit comprising a developing roller and a developing frame supporting the developing roller; and a process cartridge frame comprising:

a connection frame extending in the left-right direction:

a first left side wall disposed on a first side of the connection frame, the first left side wall being connected to a left end portion of the connection frame, the first left side wall being configured to support a left end portion of a toner cartridge storing toner;

a first right side wall disposed on the first side of the connection frame, the first right side wall being connected to a right end portion of the connection frame, the first right side wall being configured to support a right end portion of the toner cartridge;

a second left side wall disposed on a second side of the connection frame, the second left side wall supporting a left end portion of the photosensitive drum; and a second right side wall disposed on the second side of the connection frame, the second right side wall supporting a right end portion of the photosensitive drum, wherein a distance in the left-right direction between the first left side wall and the first right side wall is longer than a distance in the left-right direction between the second left side wall and the second right side wall.

7. The process cartridge according to claim 6, wherein a seal member is interposed between the developing frame and the connection frame.

8. The process cartridge according to claim 7, wherein the toner cartridge has a toner supply opening for supplying toner, wherein the connection frame has a toner receiving opening for receiving toner supplied from the toner supply opening, wherein the developing frame has a developing frame opening, the developing frame opening being in communication with the toner receiving opening, wherein the seal member has a communication opening overlapped with both the developing frame opening and the toner receiving opening as viewed in an up-down direction, and wherein, in a case where the toner cartridge is supported between the first left side wall and the first right side wall, the toner supply opening is configured to communicate with the developing frame opening through both the toner receiving opening and the communication opening.

9. The process cartridge according to claim 6, wherein the toner cartridge has a toner supply opening for supplying toner, wherein the connection frame has a toner receiving opening for receiving toner supplied from the toner supply opening;

wherein the developing frame has a developing frame opening, the developing frame opening being in communication with the toner receiving opening, and wherein, in a case where the toner cartridge is supported between the first left side wall and the first right side wall, the toner supply opening is configured to communicate with the developing frame opening through the toner receiving opening.

10. The process cartridge according to claim 6, wherein the toner cartridge is pivotally movable between:

an attachment/detachment position where the toner cartridge is attachable to and detachable from the process cartridge; and a fixed position where the toner cartridge is fixed to the process cartridge.

11. A process cartridge comprising:

a photosensitive drum rotatable about a drum axis extending in a first direction;

a developing unit comprising a developing roller and a developing frame supporting the developing roller; and a process cartridge frame comprising:

a pair of first side walls configured to support both end portions of a toner cartridge in the first direction, the pair of first side walls being spaced apart from each other in the first direction;

a connection frame connecting the pair of first side walls; and a pair of second side walls supporting both end portions of the developing unit in the first direction, the pair of second side walls being positioned on an opposite side of the connection frame from the pair of first side walls, the pair of second side walls being spaced apart from each other in the first direction, wherein a distance in the first direction between the pair of first side walls is longer than a distance in the first direction between the pair of second side walls.

* * * * *